US009329877B2

(12) United States Patent
Donaldson et al.

(10) Patent No.: US 9,329,877 B2
(45) Date of Patent: May 3, 2016

(54) STATIC VERIFICATION OF PARALLEL PROGRAM CODE

(75) Inventors: Alastair Francis Donaldson, Charlbury (GB); Shaz Qadeer, Mercer Island, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 422 days.

(21) Appl. No.: 13/423,255

(22) Filed: Mar. 18, 2012

(65) Prior Publication Data
US 2013/0241941 A1     Sep. 19, 2013

(51) Int. Cl.
*G06F 9/44* (2006.01)
*G06F 9/445* (2006.01)

(52) U.S. Cl.
CPC .................. *G06F 9/44589* (2013.01)

(58) Field of Classification Search
None
See application file for complete search history.

(56) References Cited

U.S. PATENT DOCUMENTS

| | | | | |
|---|---|---|---|---|
| 7,376,866 | B1 * | 5/2008 | Sarma | 714/16 |
| 7,673,181 | B1 | 3/2010 | Lindo et al. | |
| 7,926,025 | B2 * | 4/2011 | Campbell et al. | 717/104 |
| 2006/0010420 | A1 * | 1/2006 | Peterson et al. | 717/106 |
| 2006/0101476 | A1 * | 5/2006 | Robert | 719/328 |
| 2007/0250820 | A1 * | 10/2007 | Edwards et al. | 717/131 |
| 2009/0259829 | A1 | 10/2009 | Grover et al. | |
| 2011/0063306 | A1 | 3/2011 | Diard | |
| 2011/0072249 | A1 | 3/2011 | Nickolls et al. | |
| 2011/0219221 | A1 | 9/2011 | Skadron et al. | |
| 2012/0054715 | A1 * | 3/2012 | Welchman et al. | 717/106 |

OTHER PUBLICATIONS

Prabhu et al., "EigenCFA: Accelerating Flow Analysis with GPUs," Copyright 2011 ACM.*
Dillig, "A Modular and Symbolic Approach to Static Program Analysis," stanford.edu, Nov. 2011.*
Juravle, "Automatic program analysis for data parallel kernels," Utrecht Univ, Jul. 2011.*
Resios, "GPU performance prediction using parametrized models," Utrecht Univ, Jul. 2011.*
Li, et al., "GKLEE: Concolic Verification and Test Generation for GPUs", Retrieved Jan. 11, 2012 at <<http://www.cs.utah.edu/~ligd/publications/GKLEE-PPoPP12.pdf >>, Proceedings of 17th ACM SIGPLAN Symposium on Principles and Practice of Parallel Programming, Feb. 25-29, 2012, 10 pages.
Zheng, et al., "GRace: A Low-Overhead Mechanism for Detecting Data Races in GPU Programs", Retrieved Jan. 11, 2012 at <<http://www.cse.ohio-state.edu/~qin/pub-papers/GRace-PPoPP11.pdf >>, Proceedings: 17th ACM SIGPLAN Symposium on Principles and Practice of Parallel Programming, 2011, Feb. 12-16, 2011, 11 pages.
Barnett, et al., "Boogie: A modular reusable verifier for object-oriented programs", Retrieved Jan. 11, 2012 at <<http://citeseerx.ist.psu.edu/viewdoc/download;jsessionid=EB95D887633F14E8705-22887477E45C5?doi=10.1.1.69.2596&rep=rep1&type=pdf>>, in FMCO, LNCS 4111, 2005, pp. 364-387.

(Continued)

*Primary Examiner* — Insun Kang
(74) *Attorney, Agent, or Firm* — Alin Corie; Sandy Swain; Micky Minhas

(57) ABSTRACT

A symbolic encoding of predicated execution for static verification, based on a plurality of data parallel program instructions, is obtained. A result of static verification of one or more attributes associated with the plurality of data parallel program instructions is obtained, based on the symbolic encoding.

20 Claims, 18 Drawing Sheets

(56) References Cited

OTHER PUBLICATIONS

Biere, et al., "Bounded model checking", Retrieved Jan. 11, 2012 at <<http://citeseerx.ist.psu.edu/viewdoc/download?doi=10.1.1.60.9074&rep=rep1&type=pdf>>, Advances in Computers, vol. 58, 2003, pp. 118-149.

Boyer, et al., "Automated dynamic analysis of CUDA programs", Retrieved Jan. 11, 2012 at <<http://citeseerx.ist.psu.edu/viewdoc/download;jsessionid=C14EDC67465BED90F29D5613B31A245-A?doi=10.1.1.143.5346&rep=rep1&type=pdf>>, in 3rd Workshop on Software Tools for MultiCore Systems, 2008, 6 pages.

Cates, et al., "GIST: an interactive, GPU-based level set segmentation tool for 3D medical images", Retrieved Jan. 11, 2012 at <<http://citeseerx.ist.psu.edu/viewdoc/download?doi=10.1.1.89.2119&rep=rep1&type=pdf>>, Proceedings of Medical Image Analysis, 8, 2004, pp. 217-231.

Moura, et al., "Z3: An efficient SMT solver", Retrieved Jan. 11, 2012 at <<http://ssg.ustcsz.edu.cn/~zpli/reading_July/papers/Z3%20An%20Efficient%20SMT%20Solver.pdf>>, in TACAS, LNCS 4963, 2008, pp. 337-340.

Engler, et al., "Racerx: effective, static detection of race conditions and deadlocks", Retrieved Jan. 11, 2012 at <<http://citeseerx.ist.psu.edu/viewdoc/download?doi=10.1.1.137.1635&rep=rep1&type=pdf>>, Proceedings of SOSP, 2003, pp. 237-252.

Flanagan, et al., "Houdini, an annotation assistant for ESC/Java", Retrieved Jan. 11, 2012 at <<http://users.soe.ucsc.edu/~cormac/papers/fme01.pdf>>, in FME, LNCS 2021, 2001, pp. 500-517.

Karmani, et al., "Thread contracts for safe parallelism", Retrieved Jan. 11, 2012 at <<http://www.cs.uiuc.edu/~madhu/ppopp10.pdf>>, in PPOPP, 2011, pp. 125-134.

Munshi, Aaftab, "The OpenCL specification", Retrieved Jan. 11, 2012 at <<http://www.khronos.org/registry/cl/specs/opencl-1.1.pdf>>, version 1.1, Document Revision: 44, Jun. 1, 2011, 385 pages.

Li, et al., "Scalable SMT-based verification of GPU kernel functions", Retrieved Jan. 11, 2012 at <<http://www.cs.utah.edu/~ligd/publications/CUDA-SIGSOFT-FSE10.pdf, in FSE, ACM, 2010, Nov. 7-11, 2010, pp. 187-196.

"Overview of C++ AMP", Retrieved at <<msdn.microsoft.com/en-us/library/hh265136%28v=VS.110%29.aspx>>, Retrieved date : Jan. 11, 2012, 11 pages.

"NVIDIA CUDA C programming guide", Retrieved Jan. 11, 2012 at <<http://developer.download.nvidia.com/compute/cuda/4_0/toolkit/docs/CUDA_C_Programming_Guide.pdf>>, May 6, 2011, 187 pages.

"PTX: Parallel thread execution ISA", Retrieved Jan. 11, 2012 at <<http://developer.download.nvidia.com/compute/DevZone/docs/html/C/doc/ptx_isa_2.3.pdf>>, Version 2.3, Mar. 8, 2011, 203 pages.

Savage, et al., "Eraser: A dynamic data race detector for multithreaded programs", Retrieved Jan. 11, 2012 at <<http://www.cs.washington.edu/homes/tom/pubs/eraser.pdf>>, Proceedings of ACM Trans. Comput. Syst., vol. 15, No. 4, Nov. 1997, pp. 391-411.

Stone, et al., "Accelerating advanced MRI reconstructions on GPUs", Retrieved Jan. 11, 2012 at <<http://impact.crhc.illinois.edu/ftp/conference/cf08.stone.pdf>>, Proceedings of the 5th International Conference on Computing Frontiers, May 5-7, 2008, 12 pages.

Tripakis, et al., "Checking non-interference in SPMD programs", Retrieved Jan. 11, 2012 at <<http://www.usenix.org/event/hotpar10/final_posters/Tripakis.pdf>>, Proceedings of 2nd USENIX Workshop on Hot Topics in Parallelism (HotPar), 2010, 5 pages.

Lokhmotov, A., "Mobile and embedded computing on Mali GPUs," Retrieved Feb. 15, 2012 at <<http://www.many-core.group.cam.ac.uk/ukgpucc2/talks/Lokhmotov.pdf>>, 2nd UK GPU Computing Conference (2010), 14 pages.

* cited by examiner

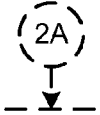

Obtain the result of static verification of the one or more attributes associated with the plurality of data parallel program instructions, based on the symbolic encoding, based on predicated execution of two threads — 210

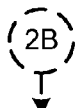

Obtain the result of static verification based on a compile time verification of the one or more attributes associated with the plurality of data parallel program instructions, based on the symbolic encoding of the plurality of data parallel program instructions that include Graphics Processing Unit (GPU) kernel program instructions — 212

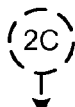

Obtain the result of static verification of the one or more attributes associated with the plurality of data parallel program instructions, based on the symbolic encoding, based on one or more of set encoding or element encoding — 214

Initiate logging operations for shared memory accesses, based on predicated execution operations of one or more threads between a first barrier and a second barrier, during the static verification — 216

312 — Obtaining the result of static verification is based on predicated execution of two threads (3B)

314 — Obtaining the result of static verification of divergence freedom includes obtaining the result of static verification of barrier divergence freedom associated a plurality of threads assigned to execute one or more Graphics Processing Unit (GPU) kernel program instructions the one or more data parallel program instructions include Graphics Processing Unit (GPU) kernel program instructions (3C)

316 — Obtaining the result of static verification is based on one or more of set encoding or element encoding (3D)

318 — Initiate logging operations for shared memory accesses, based on predicated execution operations of one or more threads between a first barrier and a second barrier, during the static verification

FIG. 3b

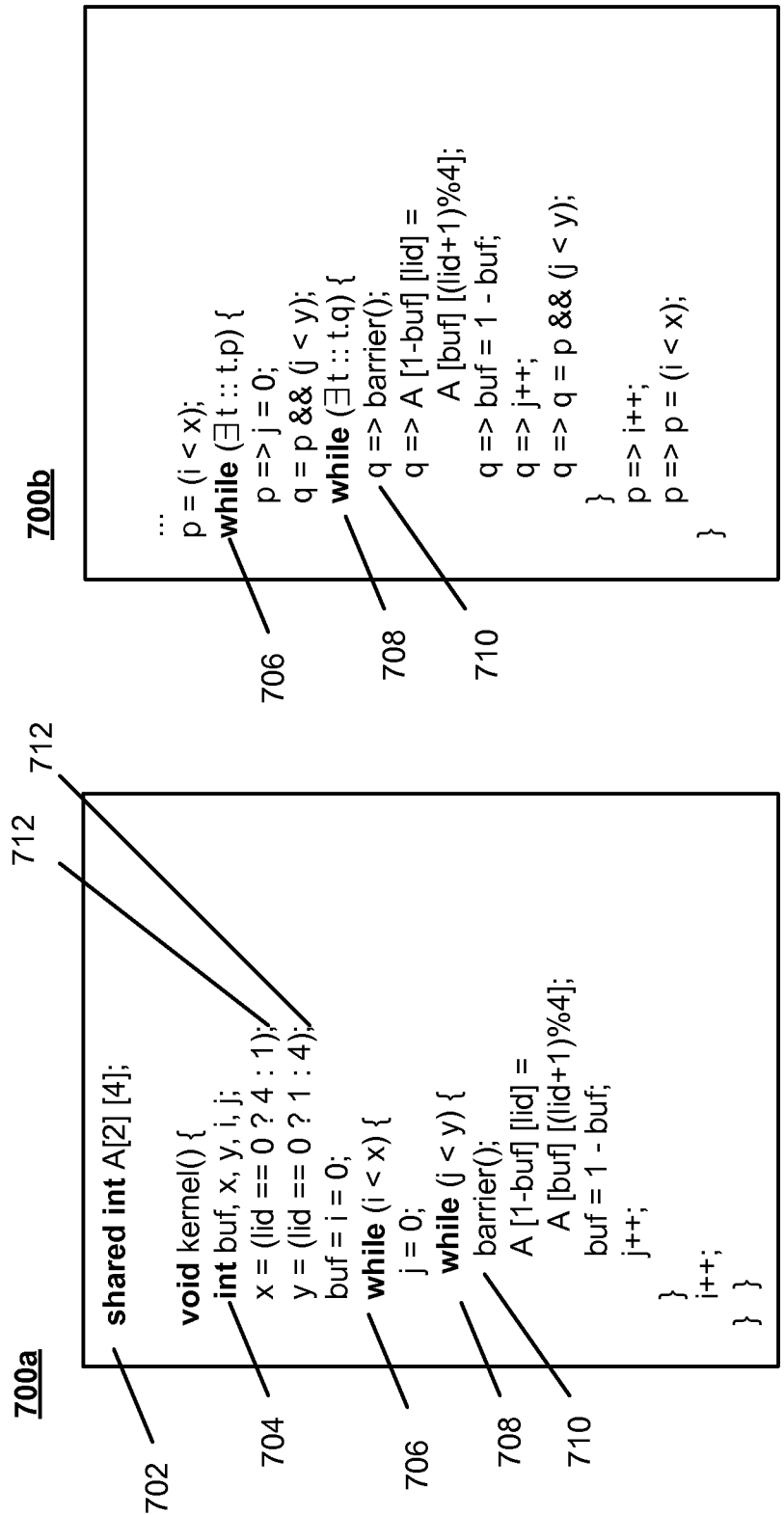

800

| | | |
|---|---|---|
| kernel | ::= | threads: number; group: number;<br>locals: name; : : : ; name;<br>body: stmt |
| stmt | ::= | basic_stmt \| stmt; stmt \| barrier$^\ell$ |
| | \| | if local_expr$^\ell$ (stmt) else (stmt) |
| | \| | while local_expr$^\ell$ (stmt) |
| basic_stmt | ::= | name := local_expr |
| | \| | name := rd(local_expr) |
| | \| | wr(local_expr, local_expr) |
| | \| | skip \| break$^\ell$ \| continue$^\ell$ |
| local_expr | ::= | *gid* \| *lid* \| name |
| | \| | constant literal of type Word |
| | \| | local_expr *op* local_expr |
| name | ::= | any valid C name |

802 → kernel
804 → stmt
806 → basic_stmt
808 → local_expr
810 → name

FIG. 8

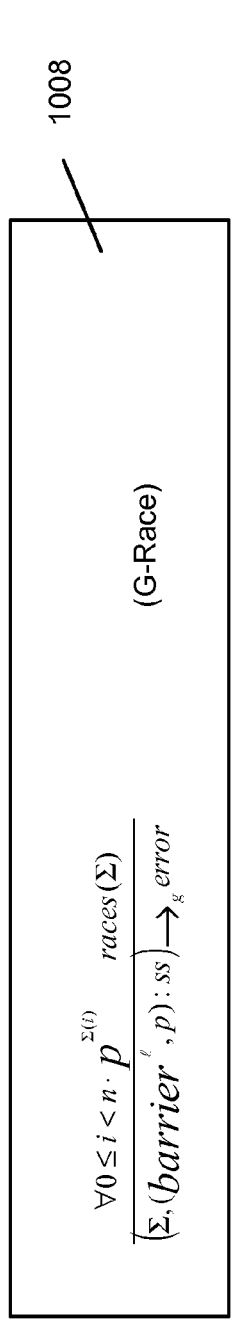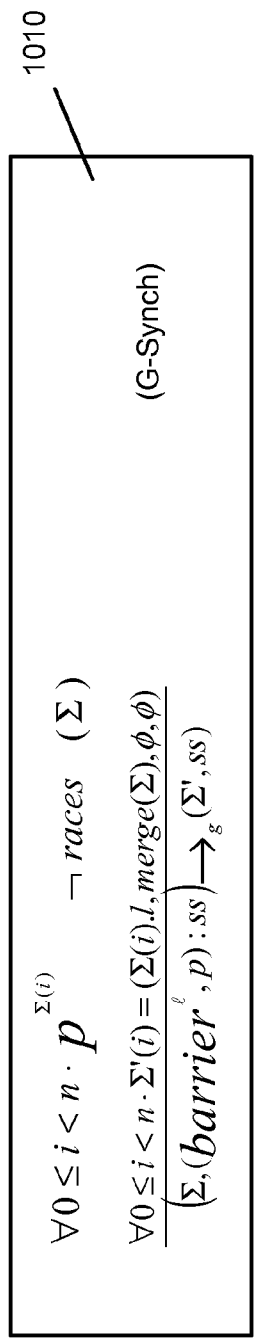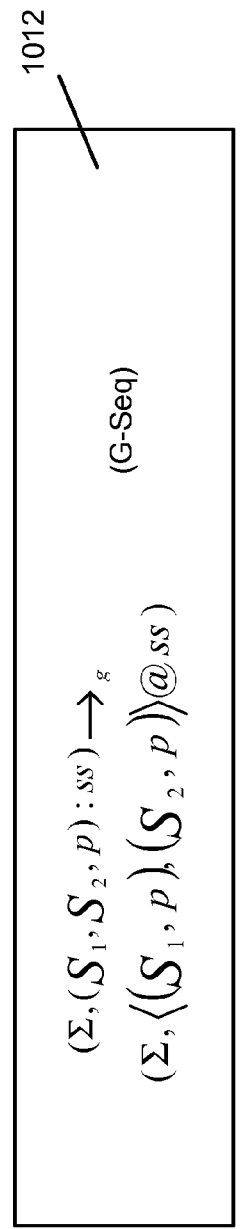
FIG. 10b

```
1100
  void BARRIER();                       ── 1102 shared bool gr [SZ] [SZ];             ── 1104 void kernel () {                      ── 1106
    int k = 0;
    while (k < SZ) {
      if (!gr[lidY] [lidX])             ── 1108
      if (gr [lidY] [k] &&               ── 1110
          gr [k] [lidX])
        gr [lidY] [lidX] = true;        ── 1112
      BARRIER();                         ── 1114
      k++;
    }
  }
```

FIG. 11

```
1200
  void BARRIER();                                      ── 1202
  void LOG_RD_gr (int y, int x);                       ── 1204
  void LOG_WR_gr (int y, int x);

shared bool gr [SZ][SZ];                             ── 1210 void kernel() {
    int k = 0;
    while (k < SZ) {                                   ── 1206
      LOG_RD_gr(lidY, lidX);
      if (!gr[lidY] [lidX])  {                         ── 1208
        LOG_RD_gr(lidY, k);
        LOG_RD_gr(k, lidX);
        if (gr [lidY] [k] &&                           ── 1212
            gr [k] [lidX])  {
          LOG_WR_gr(lidY, lidX);
          gr [lidY] [lidX] = true;
        }
      BARRIER();
      k++;
    }
  }
```

```
                                                              1202
    void BARRIER(bool en1, bool en2);                   _____/
    void LOG_RD_gr (bool en1, int y1, int x1,
                    bool en2, int y2, int x2);          _____ 1204
    void LOG_WR_gr (bool en1, int y1, int x1,      ____/
                    bool en2, int y2, int x2);               1306
    bool gr1 [SZ] [SZ], gr2 [SZ] [SZ];                     _/ void kernel() {
      int k1, k2;
      bool LC1, LC2, P1, P2, Q1, Q2; // Predicates'
                                                              1302
      // Assume that the pair of threads are distinct  _____/
      assume (lidX1 != lidX2 || lidY1 != lidY2);
      // Not shown: assume that thread ids lie in appropriate range
      k1, k2 = 0, 0;
      LC1, LC2 = k1 < SZ, k2 < SZ;                            1304
      while (LC1 || LC2) {
        LOG_RD_gr (LC1, lidY1, lidX1, LC2, lidY2, lidX2);
        P1, P2 = LC1 && !gr1 [lidY1] [lidX1],
                 LC2 && !gr2 [lidY2] [lidX2];
        LOG_RD_gr (P1, lidY1, k1, P2, lidY2, k2);
        LOG_RD_gr (P1, k1, lidX1, P2, k2, lidX2);
        Q1, Q2 = P1 && gr1 [lidY1][k1] && gr1 [k1] [lidX1],
                 P2 && gr2 [lidY2] [k2] && gr2 [k2] [lidX2];
        LOG_WR_gr (Q1, lidY1, lidX1, Q2, lidY2, lidX2);
        gr1 [lidY1] [lidX1], gr2 [lidY2] [lidX2] =
            Q1 ? true : gr1 [lidY1] [lidX1],
            Q2 ? true : gr2 [lidY2] [lidX2];
        BARRIER(LC1, LC2);
        k1, k2 = LC1 ? k1 + 1 : k1, LC2 ? k2 + 1 : k2;
        LC1, LC2 = LC1 && k1 < SZ, LC2 && k2 < SZ;
      }}
```

FIG. 13

STATIC VERIFICATION OF PARALLEL PROGRAM CODE

BACKGROUND

Users of electronic devices are increasingly relying on massively parallel accelerator processors, as they offer large amounts of computing power at a low cost. For example, graphics processing units (GPUs) from companies such as AMD and NVIDIA, have become widely available to end-users. For example, tasks such as media processing, medical imaging and eye-tracking may be accelerated to out-perform CPUs by orders of magnitude. However, GPUs may present challenges for software developers, as users may desire applications that exhibit portable correctness, for example, for operating correctly on any GPU accelerator. Software bugs in media processing domains may involve financial implications, and GPUs are being used increasingly in domains such as medical image processing where incorrect imaging results may lead indirectly to loss of life.

SUMMARY

According to one general aspect, a system may include a symbolic encoding component that obtains a symbolic encoding of predicated execution for static verification, based on a plurality of data parallel program instructions. The system may also include a static verification component that obtains, via a device processor, a result of static verification of one or more attributes associated with the plurality of data parallel program instructions, based on the symbolic encoding.

According to another aspect, a symbolic encoding of predicated execution for static verification may be obtained, based on one or more data parallel program instructions. A result of static verification of divergence freedom associated with the one or more data parallel program instructions may be obtained based on the symbolic encoding.

According to another aspect, a computer program product tangibly embodied on a computer-readable storage medium may include executable code that may cause at least one data processing apparatus to obtain a symbolic encoding of predicated execution for static verification, based on one or more data parallel program instructions. Further, the at least one data processing apparatus may obtain a result of static verification of race freedom associated with the one or more data parallel program instructions based on the symbolic encoding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 7 illustrates an example kernel and an example predicated form of the example kernel.

FIG. 8 depicts an example syntax for an example Kernel Programming Language (KPL), in accordance with example embodiments.

FIG. 11 depicts an example kernel.

FIG. 12 depicts an example instrumented kernel, in accordance with an example embodiment.

FIG. 13 depicts an example kernel resulting from transforming an access-instrumented kernel, in accordance with an example embodiment.

DETAILED DESCRIPTION

Parallel accelerator processors, such as graphics processing units (GPUs) from companies such as AMD and NVIDIA, have become widely available to end-users. Accelerators offer large amounts of computing power at a low cost, and tasks such as media processing, medical imaging and eye-tracking can be accelerated to out-perform CPUs by orders of magnitude.

GPUs may present challenges for software developers. For example, a system may include one or more of the various devices on the market, and many more products are currently in development. Users of applications for parallel accelerator processors may desire portable correctness, so that the applications may operate correctly on any GPU accelerator.

Example techniques discussed herein may provide static verification of data parallel program code (e.g., compile-time verification). In this context, a "data parallel program" may refer to executable programs in which data may be distributed over multiple parallel computing nodes. For example, in a multiprocessor system executing a single set of instructions (e.g., Single Instruction Multiple Data (SIMD)), data parallelism may be achieved when each processor performs a same task on different portions of distributed data. For example, a single execution thread may control operations on the various portions of data. As another example, different threads may control the operation, but the threads may execute the same code. In this context, a "thread" may refer to a smallest unit of processing that may be scheduled by an operating system. For example, multiple threads may share resources such as memory.

Example techniques discussed herein may provide static verification of data parallel program instructions. Thus, example techniques discussed herein may also provide static verification of GPU kernels. For example, the static verification may during compilation of the program code.

In this context, a "GPU kernel" may refer to a SIMD program designed for execution on a GPU.

For example, techniques discussed herein may address several issues associated with static verification of GPU kernels written in kernel programming languages such as CUDA, OpenCL and C++AMP. For example, writing correct GPU kernels may be more difficult than writing correct sequential code, based on two classes of bugs (e.g., sources of execution errors), which may be referred to herein as data races and barrier divergence.

Figure 1:
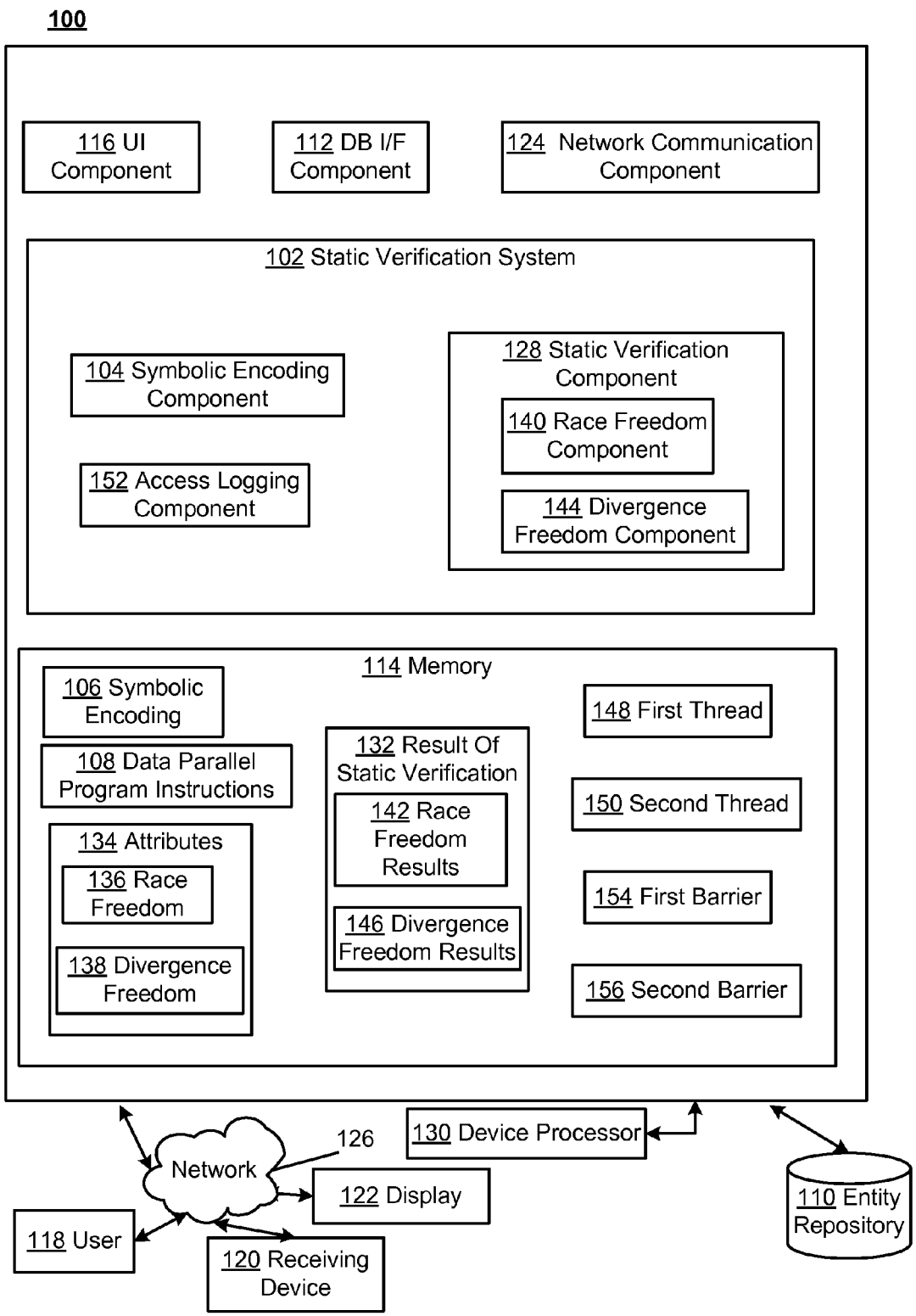
FIG. 1 is a block diagram of an example system for static verification of parallel program code.

As further discussed herein, FIG. 1 is a block diagram of a system 100 for static verification of parallel program code. As shown in FIG. 1, a system 100 may include a static verification system 102 that includes a symbolic encoding component 104 that may obtain a symbolic encoding 106 of predicated execution for static verification, based on a plurality of data parallel program instructions 108.

For example, the symbolic encoding component 104 may obtain the symbolic encoding 106 as input from a user, or may obtain the symbolic encoding 106 based on conversion operations of a front-end processor.

According to an example embodiment, the static verification system 102 may include executable instructions that may be stored on a computer-readable storage medium, as discussed below. According to an example embodiment, the computer-readable storage medium may include any number of storage devices, and any number of storage media types, including distributed devices.

For example, an entity repository 110 may include one or more databases, and may be accessed via a database interface component 112. One skilled in the art of data processing will appreciate that there are many techniques for storing repository information discussed herein, such as various types of database configurations (e.g., relational databases, hierarchical databases, distributed databases) and non-database configurations.

According to an example embodiment, the static verification system 102 may include a memory 114 that may store the symbolic encoding 106. In this context, a "memory" may include a single memory device or multiple memory devices configured to store data and/or instructions. Further, the memory 114 may span multiple distributed storage devices.

According to an example embodiment, a user interface component 116 may manage communications between a user 118 and the static verification system 102. The user 118 may be associated with a receiving device 120 that may be associated with a display 122 and other input/output devices. For example, the display 122 may be configured to communicate with the receiving device 120, via internal device bus communications, or via at least one network connection.

According to an example embodiment, the static verification system 102 may include a network communication component 124 that may manage network communication between the static verification system 102 and other entities that may communicate with the static verification system 102 via at least one network 126. For example, the at least one network 126 may include at least one of the Internet, at least one wireless network, or at least one wired network. For example, the at least one network 126 may include a cellular network, a radio network, or any type of network that may support transmission of data for the static verification system 102. For example, the network communication component 124 may manage network communications between the static verification system 102 and the receiving device 120. For example, the network communication component 124 may manage network communication between the user interface component 116 and the receiving device 120.

A static verification component 128 may obtain, via a device processor 130, a result 132 of static verification of one or more attributes 134 associated with the plurality of data parallel program instructions 108, based on the symbolic encoding 106. For example, the attributes 134 may include one or more of a race freedom attribute 136 or a divergence freedom attribute 138, as discussed further herein. One skilled in the art of data processing will understand that other attributes may also be verified by example techniques discussed herein, without departing from the spirit of the discussion herein.

In this context, a "processor" may include a single processor or multiple processors configured to process instructions associated with a processing system. A processor may thus include multiple processors processing instructions in parallel and/or in a distributed manner. Although the device processor 130 is depicted as external to the static verification system 102 in FIG. 1, one skilled in the art of data processing will appreciate that the device processor 130 may be implemented as a single component, and/or as distributed units which may be located internally or externally to the static verification system 102, and/or any of its elements.

According to an example embodiment, the static verification component 128 may include a race freedom component 140 that may obtain a result of static verification of race freedom 142 associated with the plurality of data parallel program instructions 108, based on the symbolic encoding 106. For example, an inter-group data race may occur if there are two threads $t_1$ and $t_2$ from different groups such that $t_1$ writes to a location in global memory and $t_2$ writes to or reads from this location. For example, an intra-group data race occurs if there are two threads $t_1$ and $t_2$ from the same group such that $t_1$ writes to a location in global or shared memory, $t_2$ writes to or reads from this location, and no barrier statement is executed between these accesses. For example, races may produce nondeterministic kernel behavior, and computation of incorrect results.

According to an example embodiment, the static verification component 128 may include a divergence freedom component 144 that may obtain a result of static verification of divergence freedom 146 associated with the plurality of data parallel program instructions 108, based on the symbolic encoding 106. For example, if threads in a same group diverge, reaching different barriers, then kernel behavior may be undefined (e.g., execution may hang or produce unintended side effects).

According to an example embodiment, the static verification component 128 may obtain the result 132 of static verification of the one or more attributes 134 associated with the plurality of data parallel program instructions 108, based on the symbolic encoding 106, based on predicated execution of two threads 148, 150. As discussed further below, the predicated execution may include a predicated execution of a pair of arbitrary, distinct threads. As shown in FIG. 1, the two threads 148, 150 are depicted as two storage objects, as the threads 148, 150 may be represented in a static verification via two variables which take on various values during the course of the verification, as discussed further herein.

According to an example embodiment, the static verification component 128 may obtain, via the device processor 130, the result 132 of static verification based on a compile time verification of the one or more attributes 134 associated with the plurality of data parallel program instructions 108, based on the symbolic encoding 106 of the plurality of data parallel program instructions 108 that include Graphics Processing Unit (GPU) kernel program instructions.

According to an example embodiment, the static verification component 128 may obtain the result 132 of static verification of the one or more attributes 134 associated with the plurality of data parallel program instructions 108, based on the symbolic encoding 106, based on one or more of set encoding or element encoding, as discussed further below.

According to an example embodiment, an access logging component 152 may initiate logging operations for shared memory accesses, based on predicated execution operations of one or more threads between a first barrier 154 and a second barrier 156, during the static verification, as discussed further below.

Figure 2A:
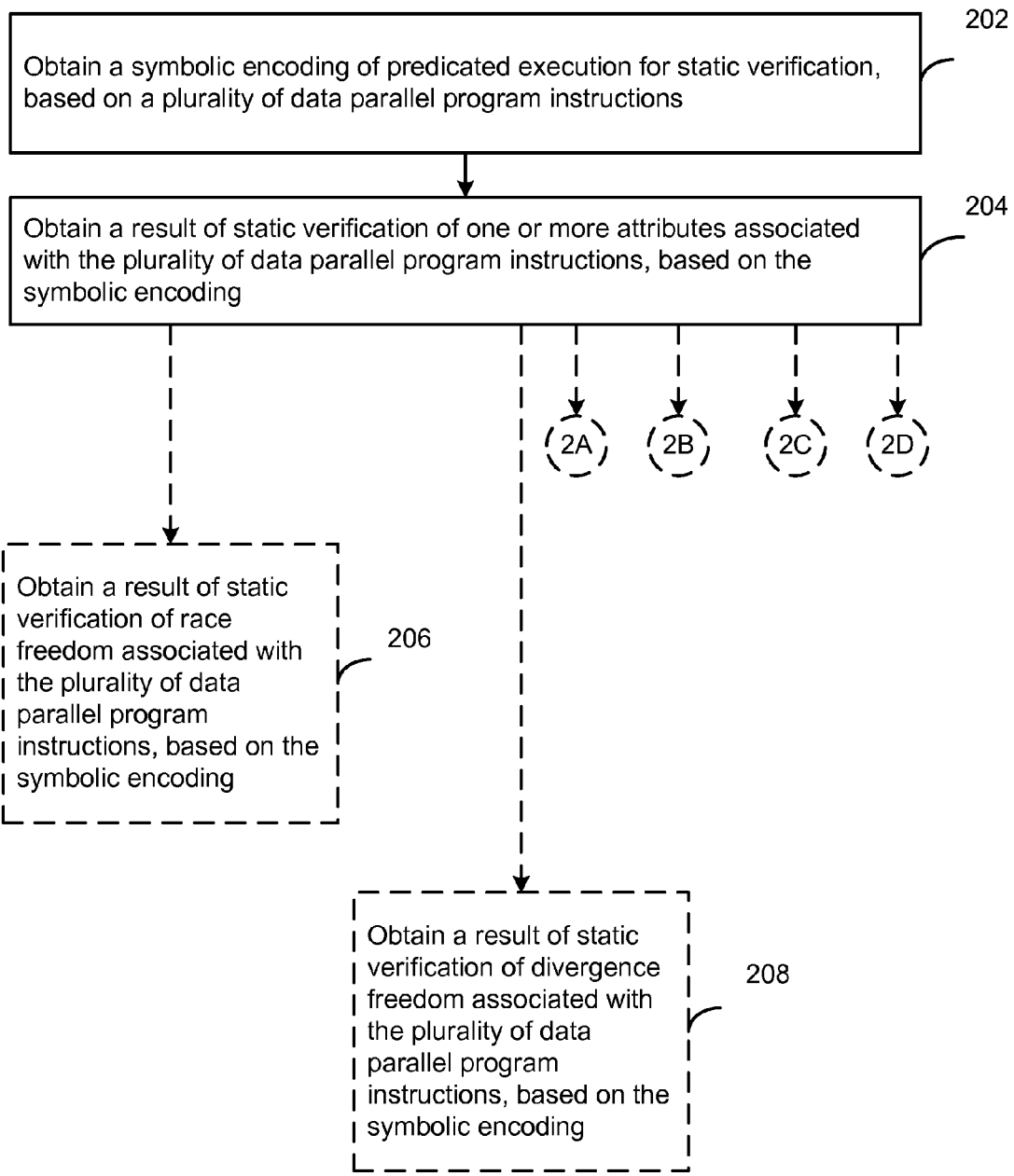
FIG. 2 is a flowchart illustrating example operations of the system of FIG. 1.

FIG. 2 is a flowchart illustrating example operations of the system of FIG. 1, according to example embodiments. In the example of FIG. 2a, symbolic encoding of predicated execution for static verification, based on a plurality of data parallel program instructions, may be obtained (202). For example, the symbolic encoding component 104 may obtain the symbolic encoding 106 of predicated execution for static verification, based on the plurality of data parallel program instructions 108, as discussed above.

A result of static verification of one or more attributes associated with the plurality of data parallel program instructions may be obtained, based on the symbolic encoding (204). For example, the static verification component 128 may obtain, via the device processor 130, the result 132 of static verification of one or more attributes 134 associated with the plurality of data parallel program instructions 108, based on the symbolic encoding 106, as discussed above.

According to an example embodiment, a result of static verification of race freedom associated with the plurality of data parallel program instructions may be obtained, based on the symbolic encoding (206). For example, the race freedom component 140 may obtain a result of static verification of race freedom 142 associated with the plurality of data parallel program instructions 108, based on the symbolic encoding 106, as discussed above.

According to an example embodiment, a result of static verification of divergence freedom associated with the plurality of data parallel program instructions may be obtained, based on the symbolic encoding (208). For example, the divergence freedom component 144 may obtain a result of static verification of divergence freedom 146 associated with the plurality of data parallel program instructions 108, based on the symbolic encoding 106, as discussed above.

According to an example embodiment, the result of static verification of the one or more attributes associated with the plurality of data parallel program instructions, based on the symbolic encoding, may be obtained based on predicated execution of two threads (210). For example, the static verification component 128 may obtain the result 132 of static verification of the one or more attributes 134 associated with the plurality of data parallel program instructions 108, based on the symbolic encoding 106, based on predicated execution of two threads 148, 150, as discussed above.

According to an example embodiment, the result of static verification may be obtained based on a compile time verification of the one or more attributes associated with the plurality of data parallel program instructions, based on the symbolic encoding of the plurality of data parallel program instructions that include Graphics Processing Unit (GPU) kernel program instructions (212). For example, the static verification component 128 may obtain, via the device processor 130, the result 132 of static verification based on a compile time verification of the one or more attributes 134 associated with the plurality of data parallel program instructions 108, based on the symbolic encoding 106 of the plurality of data parallel program instructions 108 that include Graphics Processing Unit (GPU) kernel program instructions, as discussed above.

According to an example embodiment, the result of static verification of the one or more attributes associated with the plurality of data parallel program instructions, based on the symbolic encoding, may be obtained based on one or more of set encoding or element encoding (214). For example, the static verification component 128 may obtain the result 132 of static verification of the one or more attributes 134 associated with the plurality of data parallel program instructions 108, based on the symbolic encoding 106, based on one or more of set encoding or element encoding, as discussed above.

According to an example embodiment, logging operations for shared memory accesses may be initiated, based on predicated execution operations of one or more threads between a first barrier and a second barrier, during the static verification (216). For example, the access logging component 152 may initiate logging operations for shared memory accesses, based on predicated execution operations of one or more threads between a first barrier 154 and a second barrier 156, during the static verification, as discussed above.

Figure 3A:
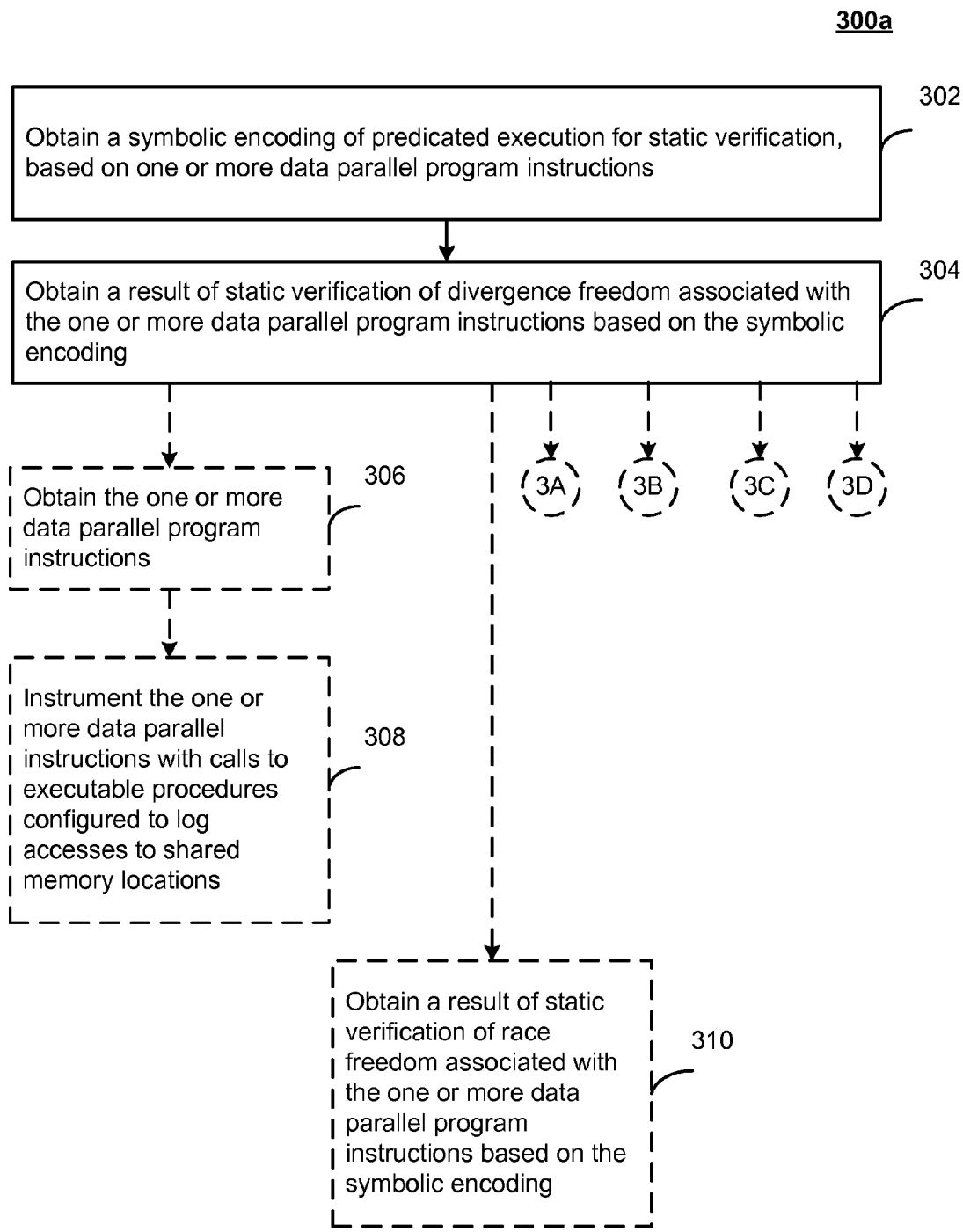
FIG. 3 is a flowchart illustrating example operations of the system of FIG. 1.

FIG. 3 is a flowchart illustrating example operations of the system of FIG. 1, according to example embodiments. In the example of FIG. 3a, a symbolic encoding of predicated execution for static verification, based on one or more data parallel program instructions, may be obtained (302). For example, the symbolic encoding component 104 may obtain the symbolic encoding 106 of predicated execution for static verification, as discussed above.

A result of static verification of divergence freedom associated with the one or more data parallel program instructions may be obtained, based on the symbolic encoding (304). For example, the divergence freedom component 144 may obtain the result of static verification of divergence freedom 146 associated with the one or more data parallel program instructions 108, based on the symbolic encoding 106, as discussed above.

According to an example embodiment, the one or more data parallel program instructions may be obtained (306). For example, a user may obtain the data parallel program instructions, or a front-end processor may obtain the data parallel program instructions.

According to an example embodiment, the one or more data parallel instructions may be instrumented with calls to executable procedures configured to log accesses to shared memory locations (308). For example, a user or a front-end processor may instrument the data parallel program instructions, as discussed further herein.

According to an example embodiment, a result of static verification of race freedom associated with the one or more data parallel program instructions may be obtained based on the symbolic encoding (310). For example, the race freedom component 140 may obtain a result of static verification of race freedom 142 associated with the data parallel program instructions 108, based on the symbolic encoding 106, as discussed above.

According to an example embodiment, obtaining the result of static verification may be based on predicated execution of two threads (312). For example, the static verification component 128 may obtain the result 132 of static verification of the one or more attributes 134 associated with data parallel program instructions 108, based on the symbolic encoding 106, based on predicated execution of two threads 148, 150, as discussed above. As discussed further below, the predicated execution may include a predicated execution of a pair of arbitrary, distinct threads.

According to an example embodiment, obtaining the result of static verification of divergence freedom may include obtaining the result of static verification of barrier divergence freedom associated a plurality of threads assigned to execute one or more Graphics Processing Unit (GPU) kernel program instructions the one or more data parallel program instructions include Graphics Processing Unit (GPU) kernel program instructions (314).

According to an example embodiment, obtaining the result of static verification may be based on one or more of set encoding or element encoding (316).

According to an example embodiment, logging operations for shared memory accesses may be initiated, based on predicated execution operations of one or more threads between a first barrier and a second barrier, during the static verification (318). For example, the access logging component 152 may initiate logging operations for shared memory accesses, based on predicated execution operations of one or more threads between a first barrier 154 and a second barrier 156, during the static verification, as discussed above.

Figure 4A:
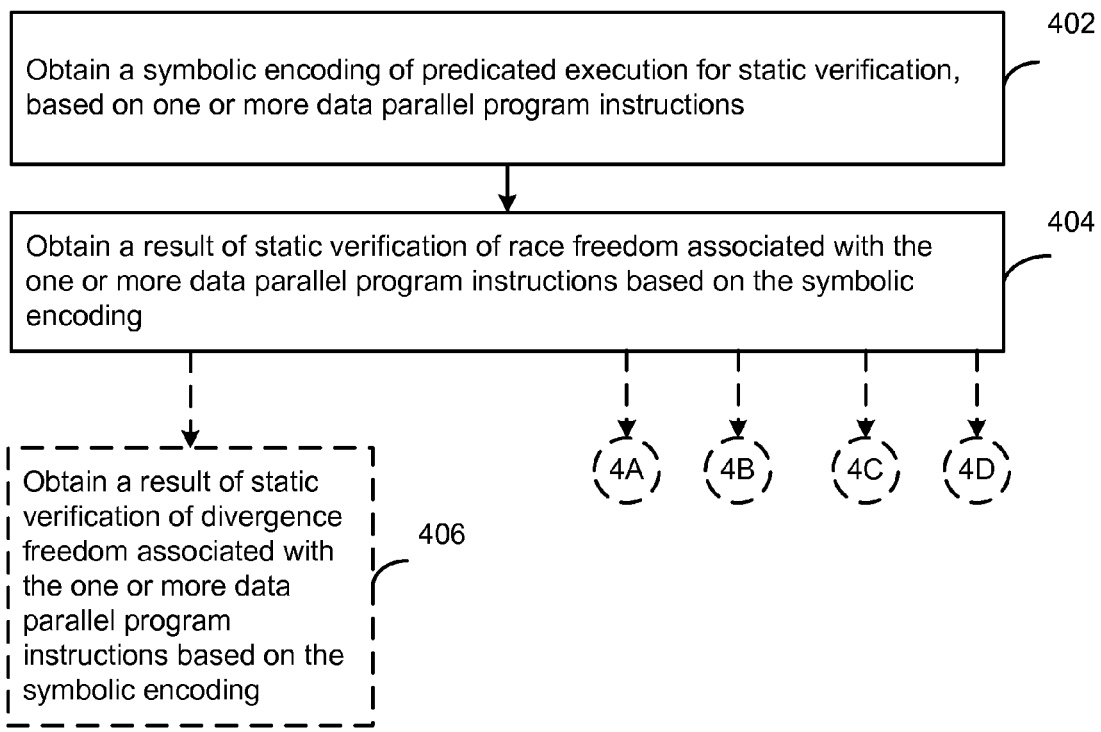
FIG. 4 is a flowchart illustrating example operations of the system of FIG. 1.
Figure 4B:
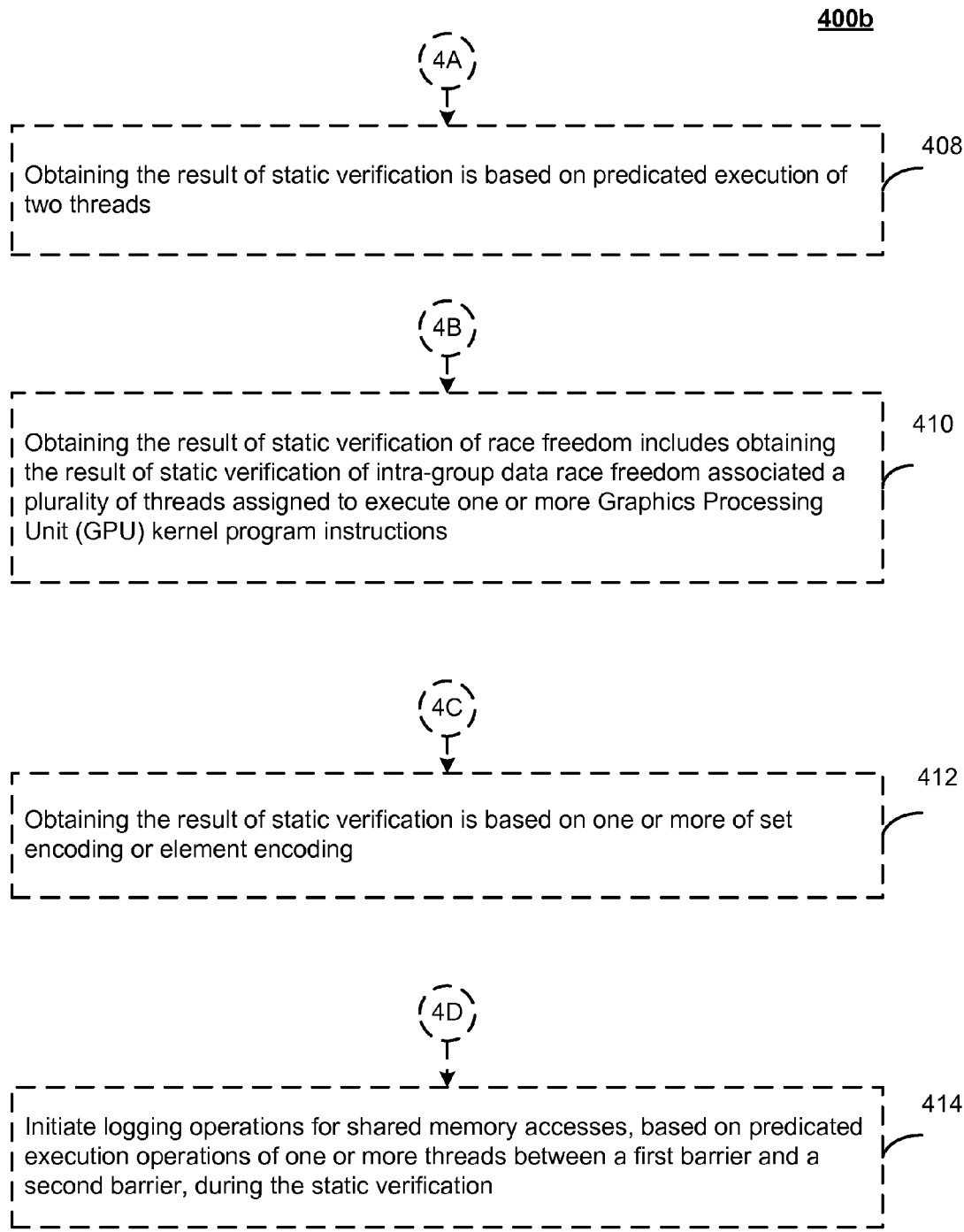

FIG. 4 is a flowchart illustrating example operations of the system of FIG. 1, according to example embodiments. In the example of FIG. 4a, a symbolic encoding of predicated execution for static verification, based on one or more data parallel program instructions, may be obtained (402). For example, the symbolic encoding component 104 may obtain the symbolic encoding 106 of predicated execution for static verification, as discussed above.

A result of static verification of race freedom associated with the one or more data parallel program instructions may be obtained, based on the symbolic encoding (404). For example, the race freedom component 140 may obtain a result of static verification of race freedom 142 associated with the data parallel program instructions 108, based on the symbolic encoding 106, as discussed above.

According to an example embodiment, a result of static verification of divergence freedom associated with the one or more data parallel program instructions may be obtained based on the symbolic encoding (406). For example, the divergence freedom component 144 may obtain the result of static verification of divergence freedom 146 associated with the one or more data parallel program instructions 108, based on the symbolic encoding 106, as discussed above.

According to an example embodiment, obtaining the result of static verification may be based on predicated execution of two threads (408). For example, the static verification component 128 may obtain the result 132 of static verification of the one or more attributes 134 associated with data parallel program instructions 108, based on the symbolic encoding 106, based on predicated execution of two threads 148, 150, as discussed above. As discussed further below, the predicated execution may include a predicated execution of a pair of arbitrary, distinct threads.

According to an example embodiment, obtaining the result of static verification of race freedom may include obtaining a result of static verification of intra-group data race freedom associated a plurality of threads assigned to execute one or more Graphics Processing Unit (GPU) kernel program instructions (410).

According to an example embodiment, obtaining the result of static verification may be based on one or more of set encoding or element encoding (412).

According to an example embodiment, logging operations for shared memory accesses may be initiated, based on predicated execution operations of one or more threads between a first barrier and a second barrier, during the static verification (414). For example, the access logging component 152 may initiate logging operations for shared memory accesses, based on predicated execution operations of one or more threads between a first barrier 154 and a second barrier 156, during the static verification, as discussed above.

Example techniques discussed herein may utilize a characterization of barrier divergence via an operational semantics based on predicated execution, which may be referred to herein as synchronous, delayed visibility (SDV) semantics.

Example techniques discussed herein may use predicated operational semantics for the purpose of specification and verification. Based on the example SDV semantics, example modular verification techniques discussed herein may reduce analysis of concurrent GPU threads to reasoning over a transformed sequential program. For example, such techniques may avoid reasoning about thread interleavings, and may enable reusing existing modular techniques for sequential programs.

According to example embodiments, techniques for static verification of data parallel program instructions (e.g., graphics processing unit (GPU) kernels) may be based on predicated execution. For example, techniques discussed herein may provide verification of race and/or divergence freedom for GPU kernels using synchronous predicated execution. For example, static verification conditions may be generated for proving the absence of divergence and races in GPU kernels. For example, these verification conditions may be verified using automated theorem provers.

For example, techniques discussed herein may encode synchronous predicated execution as a source-level program.

For example, techniques discussed herein may utilize verification conditions by restricting attention to two threads. While discussion herein may focus on verification based on behavior of two threads, one skilled in the art of data processing will understand that three threads, or four threads (or any other small number of threads that represents significantly fewer threads than an actual number for real processing), without departing from the spirit of the discussion herein.

For example, techniques discussed herein may utilize collections of templates for automatically generating invariants for modular verification.

Example techniques discussed herein may formalize divergence and race freedom via synchronous predicated execution. For example, synchronous predicated execution may be encoded directly as a source-level program.

Example techniques discussed herein may provide modular verification for GPU kernels based on automatic abstraction followed by generation of verification conditions to be solved via automated theorem proving.

Example techniques discussed herein may automatically infer contracts and invariants for example modular verification techniques.

Example techniques discussed herein may simplify the resulting verification conditions based on analyses of two threads in an environment that may include any number of other threads.

Example techniques discussed herein may provide a collection of templates for automatically generating invariants for modular verification.

According to example embodiments discussed herein, an example modular verifier for GPU kernels may be referred to herein as GPUVerify, which has been tested in experimental evaluations, at least on sets of CUDA and C++AMP kernels. For example, inter-procedural capabilities of such a verifier may provide proof of divergence-freedom for a kernel that may include of 1000+ lines of code spread over 13 procedures. Experimental results have provided a comparison of GPUVerify with PUG, a formal analysis technique for GPU software, as discussed in G. Li et al., "Scalable SMT-based verification of GPU kernel functions," *In Proceedings of the Eighteenth ACM SIGSOFT International Symposium on Foundations of Software Engineering* (FSE '10), ACM (2010), pp. 187-196.

Figure 5:
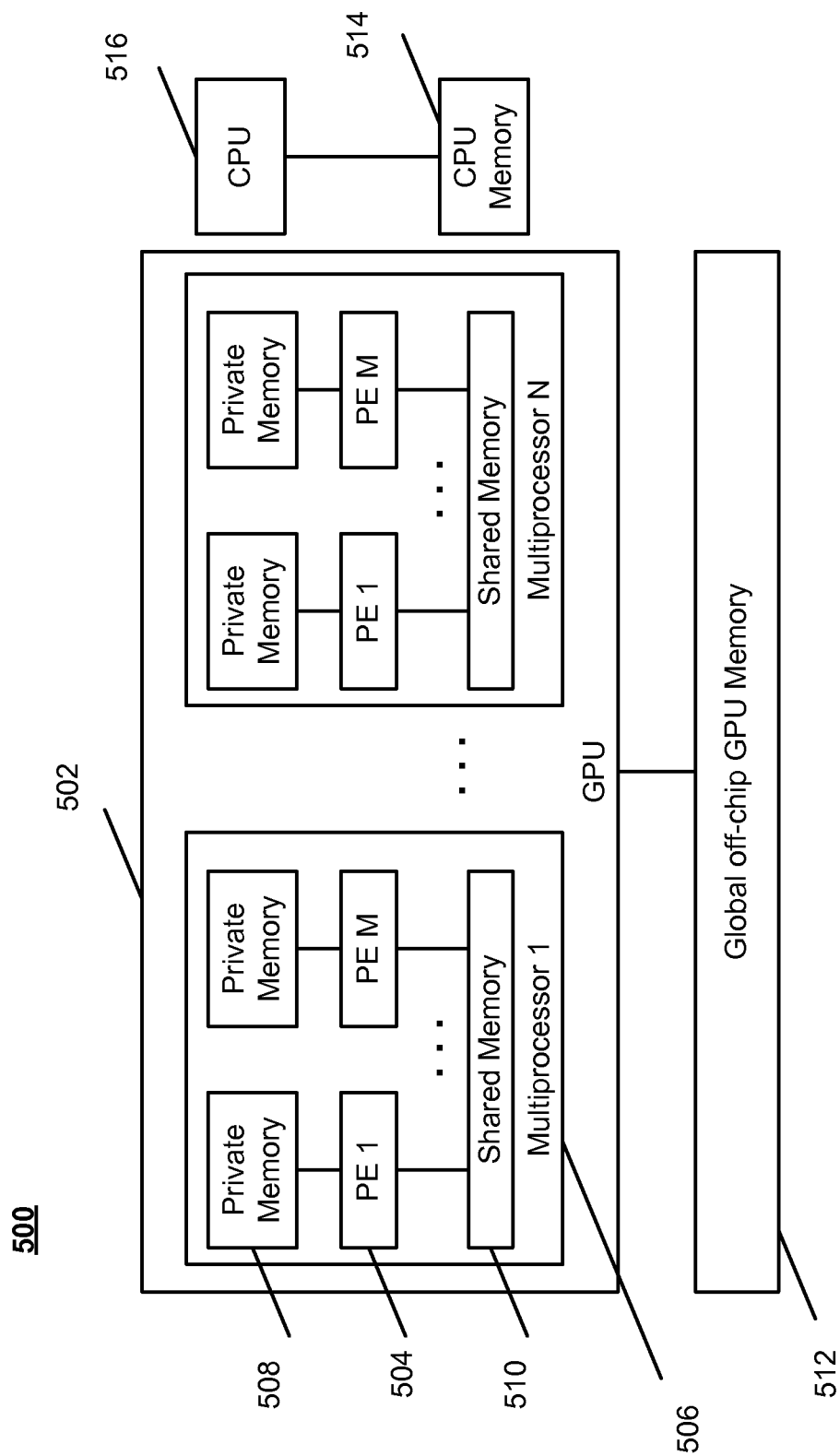
FIG. 5 is a block diagram of an example graphics processing unit (GPU).

FIG. 5 is a block diagram 500 of an example graphics processing unit (GPU). As shown in FIG. 5, a GPU 502 may include many simple processing elements (PEs) 504. For example, the PEs 504 may be referred to as cores.

Subsets of the PEs 504 may be grouped together into multiprocessors 506, such that PEs 504 grouped within a multiprocessor 506 may execute in lock-step, in accordance with single instruction, multiple data (SIMD) techniques. For example, the PEs 504 may perform the same operation on multiple data in parallel, thus providing data level parallelism in execution.

Distinct multiprocessors 506 on the GPU 502 may execute independently. Each PE 504 may be provided with a private memory 508, and PEs 504 grouped together on a same multiprocessor may access a portion of a shared memory 510 that may be dedicated to the respective multiprocessor 506. PEs 504 associated with the GPU 502 may access a large amount of off-chip memory, which may be referred to as global memory 512. Global memory 512 may be located separately from a main CPU memory 514 associated with a central processing unit (CPU) 516; however, the global memory 512 and the CPU memory 514 may also be fused.

Examples of GPU programming models may include CUDA, from NVIDIA, OPENCL, an example standard proposed by the KHRONOS Group, and C++AMP, from MICROSOFT. These example programming models provide a similar high-level abstraction for mapping computation across GPU hardware, based on a theory of a kernel program being executed by many parallel threads, coupled with a specification of techniques for partitioning these threads into groups. For example, a kernel may include a template specifying the behavior of an arbitrary thread, parameterized by thread and group identifier (id) variables. Expressions over thread and group ids may allow distinct threads to operate on separate data and follow different execution paths through the kernel. Threads in a same group may synchronize during kernel execution, while threads in distinct groups may execute completely independently.

An example runtime environment associated with a GPU programming model may interface with a driver of an available GPU (e.g., GPU 502) to schedule execution of kernel threads across processing elements (e.g., PEs 504). Each group of threads may be assigned to one of the GPU's multiprocessors 506, so that distinct groups may execute in parallel on different multiprocessors 506. For example, if a number of threads in a group is N and a number of PEs 504 in a multiprocessor 506 is M, then a group may be divided into $$\left\lceil \frac{N}{M} \right\rceil$$

sup-groups, each including up to M threads. Execution of a single group on a multiprocessor 506 may then proceed by round-robin execution of the sub-groups. Each thread in a given sub-group may be pinned to a distinct PE 504, and all threads in a same sub-group may execute together in lock-step, following a same control path. Distinct sub-groups may follow different control paths.

In accordance with example embodiments discussed herein, conditional statements and loops through which distinct threads in a same sub-group may take different paths are simulated via predicated execution.

FIG. 6 illustrates example source code instructions and example predicated forms of the source code instructions. As shown in FIG. 6a, an example conditional statement 602 denotes an if-then-else construct. As shown in FIG. 6a, lid denotes a local id of a thread within its group and x is a local variable stored in private memory (e.g., private memory 508). Using the logic of FIG. 6a, if lid>N, then x is set to 0; else x is set to 1. The statement 602 may be transformed into a straight-line code segment 604, as shown in FIG. 6b, which may be executed by a sub-group of threads in lock-step. An example statement such as "predicate=>command" is interpreted to mean that a thread executes command if "predicate" holds for that thread, otherwise the thread executes a no-op instruction. According to an example embodiment, all threads evaluate the condition lid>N into a local boolean variable p, then execute both the then and else branches of the conditional statement 602, predicated by p and !p respectively, as shown in FIG. 6b.

Figure 6A:
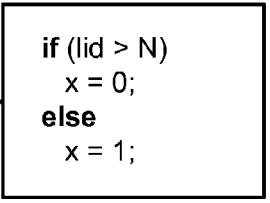
FIG. 6 illustrates example source code instructions and example predicated forms of the source code instructions.
Figure 6B:
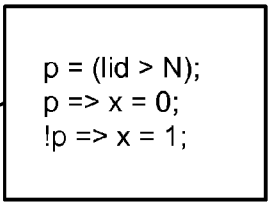
Figure 6C:
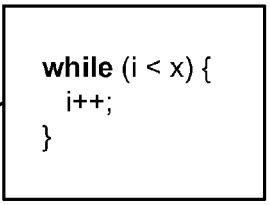
Figure 6D:
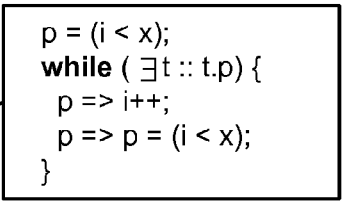

For example, FIG. 6c illustrates an example while statement 606 that denotes a while construct. As shown in FIG. 6c, i and x are local variables. Using the logic of FIG. 6c, while i<x, i is incremented by 1. According to an example embodiment, loops may be translated into predicated form by establishing that all threads in a subgroup will continue to execute the loop body until the loop condition is false for all threads in the sub-group, with threads for whom the condition does not hold becoming disabled. This is illustrated for the loop in FIG. 6c by a straight-line code segment 608 as shown in FIG. 6d. As shown in the straight-line code segment 608, the condition i<x is evaluated into local variable p. Then the thread sub-group loops while p remains true for some thread in the sub-group, indicated by ∃t::t.p. According to an example embodiment, the loop body is predicated by p, and thus has an effect only for enabled threads.

When a thread $t_1$ writes to an address in shared or global memory, the result of this write may not become visible to another thread $t_2$ unless $t_1$ and $t_2$ synchronize. Threads in distinct groups may not be able to synchronize during kernel execution. According to example embodiments discussed herein, threads in a same group g may synchronize via barriers. Intuitively, a kernel thread belonging to group g may wait at a barrier statement until every thread in g has reached the barrier. Passing the barrier may imply that all writes to shared and global memory by threads in g occurring before execution of the barrier have been committed. For example, a barrier statement may be placed at the beginning of a program, and another barrier statement may be placed at the end of the program, for example, to enable verification that threads begin execution from a same entry location, and that the threads terminate execution of the program at a same exit location.

Two classes of bugs are discussed herein that may make writing correct GPU kernels more difficult than writing correct sequential code, referred to herein as data races and barrier divergence. For example, in GPU kernels, an inter-group data race occurs if there are two threads $t_1$ and $t_2$ from different thread groups such that $t_1$ writes to a location in global memory and $t_2$ writes to or reads from this location. An intra-group data race occurs if there are two threads $t_1$ and $t_2$ from the same group such that $t_1$ writes to a location in global or shared memory, $t_2$ writes to or reads from this location, and no barrier statement is executed between these accesses. Races can lead to nondeterministic kernel behavior, and computation of incorrect results. Intra-group data races are discussed herein as data races.

If threads in a same group diverge, reaching different barriers as in the following kernel fragment:
    if ((lid % 2>==0) barrier ( ); //Even threads hit first barrier
    else barrier ( ); //Odd threads hit second barrier
then kernel behavior may be undefined.

FIG. 7 illustrates an example kernel 700a with nested loops, and a predicated version 700b of the example kernel.

As shown in FIG. 7a, the kernel 700a is intended to be executed by a group of four threads, and declares an array A 702 of two shared buffers, each of size four. A local variable buf 704 serves an index into A 702, representing the current buffer. The threads execute a nest of while loops 706, 708. On each inner loop 708 iteration, thread t reads the value of the current buffer at index lid+1 modulo 4, and writes the result into the non-current buffer at index lid. A barrier 710 is used to avoid data races on A 702. Local variables x and y are set to 4 and 1 respectively for thread 0 (at 712), and to 1 and 4 (at 714) respectively for all other threads. As a result, thread 0 will perform four outer loop 706 iterations, each involving one inner loop 708 iteration, while other threads will perform a single outer loop 706 iteration, including four inner loop 708 iterations.

Such a kernel may appear (e.g., to a user) to be valid, as all threads arrive at the barrier 710 statement four times. Taking a snapshot of the array A at each barrier and at the end of the kernel, a user may expect the following:

A={{0, 1, 2, 3}, {-, -, -, -}}→{{0, 1, 2, 3}, {1, 2, 3, 0}}→→{{2, 3, 0, 1}, {1, 2, 3, 0}}→{{2, 3, 0, 1}, {3, 0, 1, 2}}→{{0, 1, 2, 3}, {3, 0, 1, 2}}

However, as shown in FIG. 7b, an example predicated version 700b of the kernel 700a illustrates a form in which the kernel 700a may execute on an NVIDIA GPU if loops are not unrolled. The four threads may comprise a single sub-group. All threads enter outer loop 706 and execute a first inner loop 708 iteration. Then thread 0 will become disabled (q becomes false) for the inner loop 708. Thus barrier 710 will be executed with some, but not all, threads in the sub-group enabled. On NVIDIA hardware, a barrier may be compiled to a bar.sync instruction in the PTX (Parallel Thread Execution) assembly language. According to PTX documentation (NVIDIA. PTX: Parallel thread execution ISA, version 2.3, 2011), "if any thread in a [sub-group] executes a bar instruction, it is as if all the threads in the [sub-group] have executed the bar instruction". Thus, threads 1, 2 and 3 will not wait at the barrier 710 until thread 0 returns to the inner loop 708, as they will continue to execute past the barrier 710, performing three more inner loop 708 iterations. This may generate the following sequence of state-changes to A 702:

A={{0, 1, 2, 3}, {-, -, -, -}}→{{0, 1, 2, 3}, {1, 2, 3, 0}}→{{0, 3, 0, 1}, {1, 2, 3, 0}}→{{0, 3, 0, 1}, {1, 0, 1, 0}}→{{0, 1, 0, 1}, {1, 0, 1, 0}}

After the inner loop 708 exits, thread 0 becomes enabled, but all other threads become disabled, for a further three outer loop 706 iterations, during each of which thread 0 executes a single inner loop 708 iteration. The state of A 702 thus remains:

{{0, 1, 0, 1}, {1, 0, 1, 0}}.

The OpenCL standard, as discussed in Khronos OpenCL Working Group. The OpenCL specification, version 1.1, 2011. Document Revision: 44, states, "If a barrier is inside a loop, all [threads] must execute the barrier for each iteration of the loop before any are allowed to continue execution beyond the barrier", which at least may be interpreted as rejecting the example of FIG. 7.

According to example embodiments discussed herein, if a barrier is encountered by a group of threads executing in lock-step under a predicate, a requisite is that the predicate hold uniformly across the group, i.e., the predicate is either true for all threads, or false for all threads. This example definition may facilitate formal verification of divergence-freedom.

For checking barrier divergence, a thread group may be formed as a single subgroup, i.e., all threads in a group execute in lock-step (e.g., for a group of 32 threads executing on an NVIDIA GPU). In this context, "barrier divergence" may occur if the thread group executes a barrier and the threads are not uniformly enabled, i.e., the current predicate of execution holds for some threads but not others. If divergence-freedom can be proven for a kernel under this assumption, the kernel will also be divergence-free if thread groups are divided into sub-groups with a finer level of granularity.

For race checking, the scenario may be reversed. For example, threads in the same group may interleave completely asynchronously between pairs of barriers, with no assumptions as to the relative order of statement execution between threads. If race-freedom can be proved under this general condition, then a kernel will remain race-free if, in practice, certain threads in a group execute synchronously.

According to example embodiments discussed herein, an example semantics referred to herein as synchronous, delayed visibility (SDV), provides that group execution is synchronous, allowing divergence checking. Each thread's shared memory accesses are logged, and the visibility of writes to shared memory by one thread to the group is delayed until a barrier is reached. For example, delaying the visibility of writes may ensure that threads do have visibility to a synchronized view of shared and global memory between barriers (e.g., allowing that execution may not be fully synchronous, in reality). For example, logging accessed locations may allow racing accesses to be detected when threads synchronize at a barrier.

To describe the SDV semantics formally, an example Kernel Programming Language (KPL) may capture features of mainstream languages for GPU kernels. As discussed below, KPL describes execution of a single group of GPU threads. Kernels in GPU programming languages may have multiple groups, but as discussed above it may suffice, for checking divergence-freedom and intra-group race freedom, to model the execution of a single arbitrary group.

FIG. 8 illustrates an example syntax 800 for the example Kernel Programming Language, according to an example embodiment. As shown in FIG. 8, a KPL kernel 802 may declare the total number of threads in the group that will execute the kernel (threads: n), and the group's id (group: x), as, in practice, the group may be one of many. This is followed by a sequence of local variable declarations and the body of the kernel. A statement 804 may include basic statement, barriers, conditional statements (e.g., if-then-else), and loops (e.g., while statements).

For simplicity (without loss of generality), threads may have access to a single shared array which may be referred to as shared memory. As the discussion herein provides example techniques for verifying absence of intra-group data races, shared and global memory are discussed equally herein (in KPL).

A basic statement 806 may include assignments, expressions, reads, writes, skips, breaks, and continue instructions. A local expression 808 may include group ids, local ids, names, literals, and local expressions with operators. A name 810 may include any valid C name.

A thread may update one of its local variables by performing a local computation, or by reading from the shared state (v:=rd(e), where e is an expression over local variables determining which index to read from). A thread may also update the shared state (wr($e_1$, $e_2$), where $e_1$, $e_2$ are expressions over local variables, with $e_1$ determining which index to write to, and $e_2$ the value to be written). For simplicity, local variables may be scalar.

As shown in FIG. 8, KPL may include example basic statements 806, denoted as skip, which is a no-op, break, which causes execution to break out of the closest enclosing loop, and continue, which causes execution to jump to the head of the closest enclosing loop. Compound statements may be constructed via sequencing, conditional branches and loops, and a barrier statement may be used to synchronize threads. Loops, conditionals and barriers are annotated with labels (indicated by l in FIG. 8), which are all distinct. Each break and continue also has an associated label, which matches the label of the closest enclosing loop. These labels may be used in defining an example operational semantics for KPL.

Other features of GPU kernels such as procedures and multidimensional groups and arrays are not formally defined in FIG. 8; however, example verification techniques discussed herein may handle both.

As used more formally herein, given a function f: A→B and elements a∈A, b∈B, a notation f [a:=b] may denote the function g: A→B such that g(x)=f(x) for all x∈A \ {a}, and g(a)=b. For example, f [a:=b] [c:=d] may be abbreviated herein to f [a:=b, c:=d]. By viewing a tuple with named components as a function mapping names to element values, this notation may be used to specify updates to tuples. As used herein, $(s_1, s_2, \ldots, s_k)$ may denote a sequence of length k, and ⟨ z,24 may denote an empty sequence. As used herein, s:ss may denote a sequence whose first element is s, and whose remaining elements form the sequence ss. As used herein, ss@tt may denote a concatenation of sequences ss and tt.

More formally, P may denote a KPL kernel. Further, V may denote the set of local variables declared in P, together with an additional variable $p_l$ for every conditional or loop labeled by l, and further variables $b_l$ and $c_l$ for every loop labeled by l. The $p_l$ may be used to model predicated execution of conditionals and loops, while the $b_l$ and $c_l$ may be used to model break and continue statements, respectively.

In the context of the discussion herein, local variables and indexable elements of shared memory have type Word, the type of memory words. In the context of the discussion herein, any value in Word may be interpreted as an integer and a Boolean. In practical scenarios, the Word type may also represent floating point numbers, and structured data may be represented by sequences of values of type Word.

According to example embodiments discussed herein, for modeling the delayed visibility aspect of SDV, shared state may be distributed. For example, each thread may be provided with a shadow copy of shared memory. At the start of kernel execution, every thread's shadow memory may be identical. According to example embodiments discussed herein, during execution, a thread reads and modifies its shadow memory locally, and logs read and write sets, recording which addresses in shared memory the thread has accessed. When a barrier statement is reached with all threads enabled, the read and write sets may be checked for data races. For example, if a race has occurred, execution may be aborted. Otherwise, the write sets may be used to build a view of shared memory, the shadow memories may be reset to agree with this view, and the read and write sets may be cleared.

If n denotes the number of threads in the group executing a kernel. A thread state for P is may be denoted as a tuple (l, sh, R, W) where:

l: (VU {lid})→Word assigns a value to each of the thread's local variables and determines the thread's id within the group, sh: N→Word is the thread's shadow copy of shared memory, and

R,W⊆N are the thread's read and write sets, recording the shared addresses the thread has accessed since the last barrier.

As used herein, σ may denote a thread state, and σ.l, σ.sh, etc., may refer to components of σ. The set of all thread states may be denoted ThreadStates. For local expression e and thread state σ, a notation $e^σ$ may denote a result of evaluating e according to the local variables and thread id of σ.l. Expression gid (the group's id) evaluates to the integer x specified via group: x in the definition of P.

A predicated statement may be denoted as a pair (s, e), where s ∈ stmt and e ∈ local expr. Intuitively, (s, e) may denote a statement s that is executed if e holds, and otherwise may have no effect. The set of predicated statements may be denoted PredStmts.

A group state for P may be denoted as a tuple (Σ, ss) where:
$Σ=(σ_0, \ldots, σ_{n-1})$ ∈ ThreadStates$^n$ records a thread state for each thread in the group, and ss ∈ PredStmts* is an ordered sequence of program statements to be executed by the group.

As used herein, for a tuple of thread states $Σ=(σ_0, \ldots, σ_{n-1})$, a notation Σ (i) may denote $σ_i$. The set of group states may be denoted GroupStates.

As used herein, a group state (Σ, ss) is a valid initial state of P if:

ss=⟨(s, true)⟩, where s is declared in P via body: s, lid$^{Σ(i)}$=i and Σ(i).R=Σ(i).W=∅(0≤i<n), For each label l, $b_l^{Σ(i)}$=false (0≤i<n), and Σ(i).sh=Σ(j).sh (0≤i,j<n).

The third initial state condition above is discussed further herein with regard to predicated execution of while loops. The final initial state condition above may provide that threads have a consistent initial view of the shared state. This is included in initial state conditions in part due to shared state incorporation of global memory that may have been initialized by the environment. According to example embodiments herein, the example state representation does not include a single shared state component, as the shared state is represented via the shadow copies held by individual threads, which are initially consistent, and are made consistent again at each barrier.

FIG. 9 depicts example rules for predicated execution of basic statements in the example kernel programming language, according to example embodiments. FIG. 9 may define a binary relation →$_t$⊆(ThreadStates×PredStmts)×ThreadStates describing an evolution of one thread state into another under execution of a predicated statement. The relation may be defined by the rules shown in FIG. 9. As used herein, for a thread state σ and predicated statement (s, p), a notation (σ, s, p) may be used instead of (σ, (s, p)). As used in FIG. 9, →$_t$ is defined for predicated statements in which s has the form basic_stmt (806).

Figure 9A:
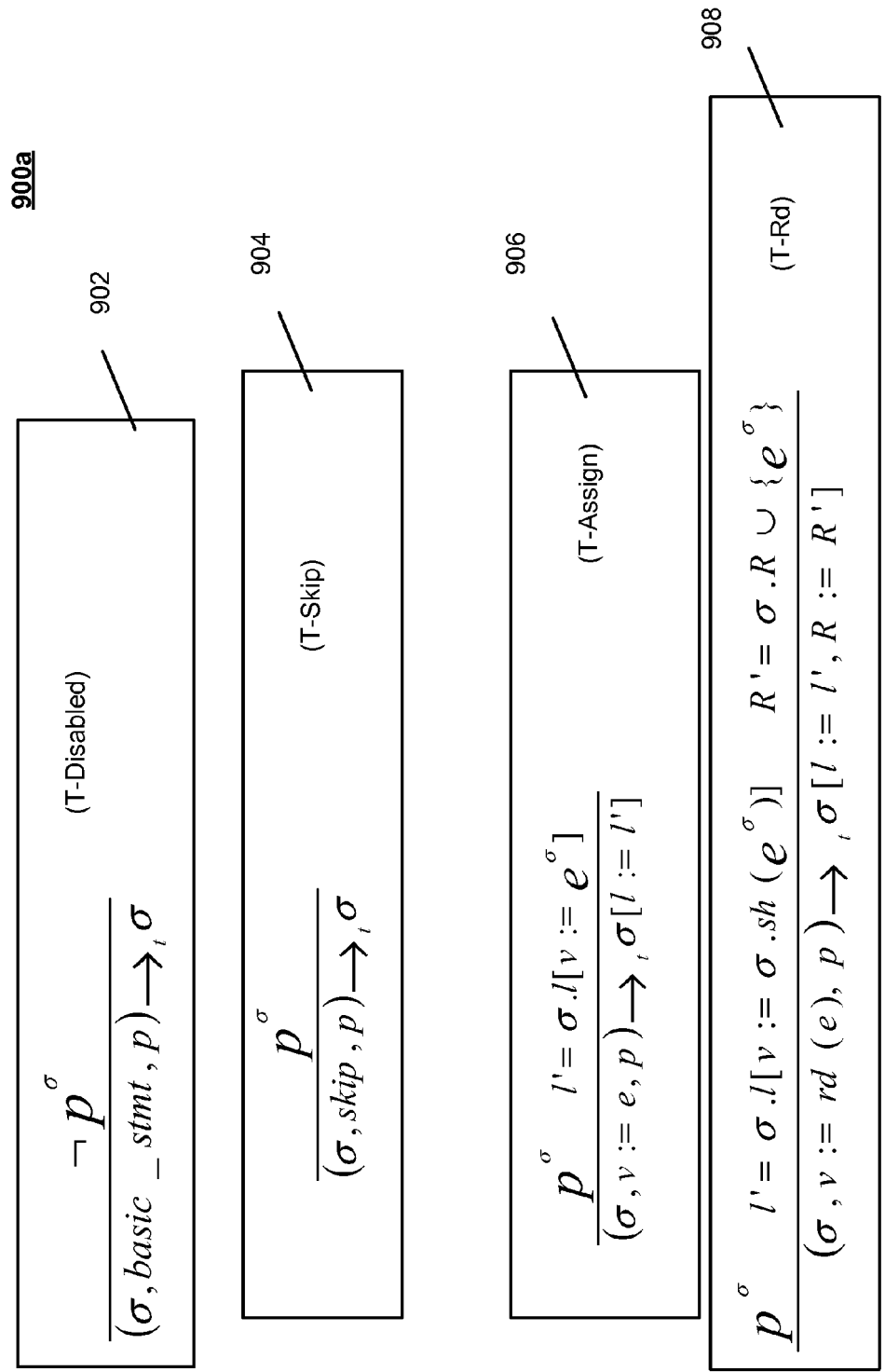
FIG. 9 depicts example rules for predicated execution of basic statements in the example kernel programming language, in accordance with example embodiments.

As shown in FIG. 9a, an example rule T-DISABLED 902 may provide that a predicated statement has no effect if the predicate does not hold, indicated by ¬p$^σ$ in the rule's premises. An example rule T-SKIP 904 may provide that a predicated statement is skipped if the predicate holds, indicated by p$^σ$ in the rule's premises.

An example rule T-ASSIGN 906 may update σ.l in accordance with the assignment. An example rule T-RD 908 may update the thread's local store with an element from the thread's shadow copy of shared memory, and may record the address that was read from.

Figure 9B:
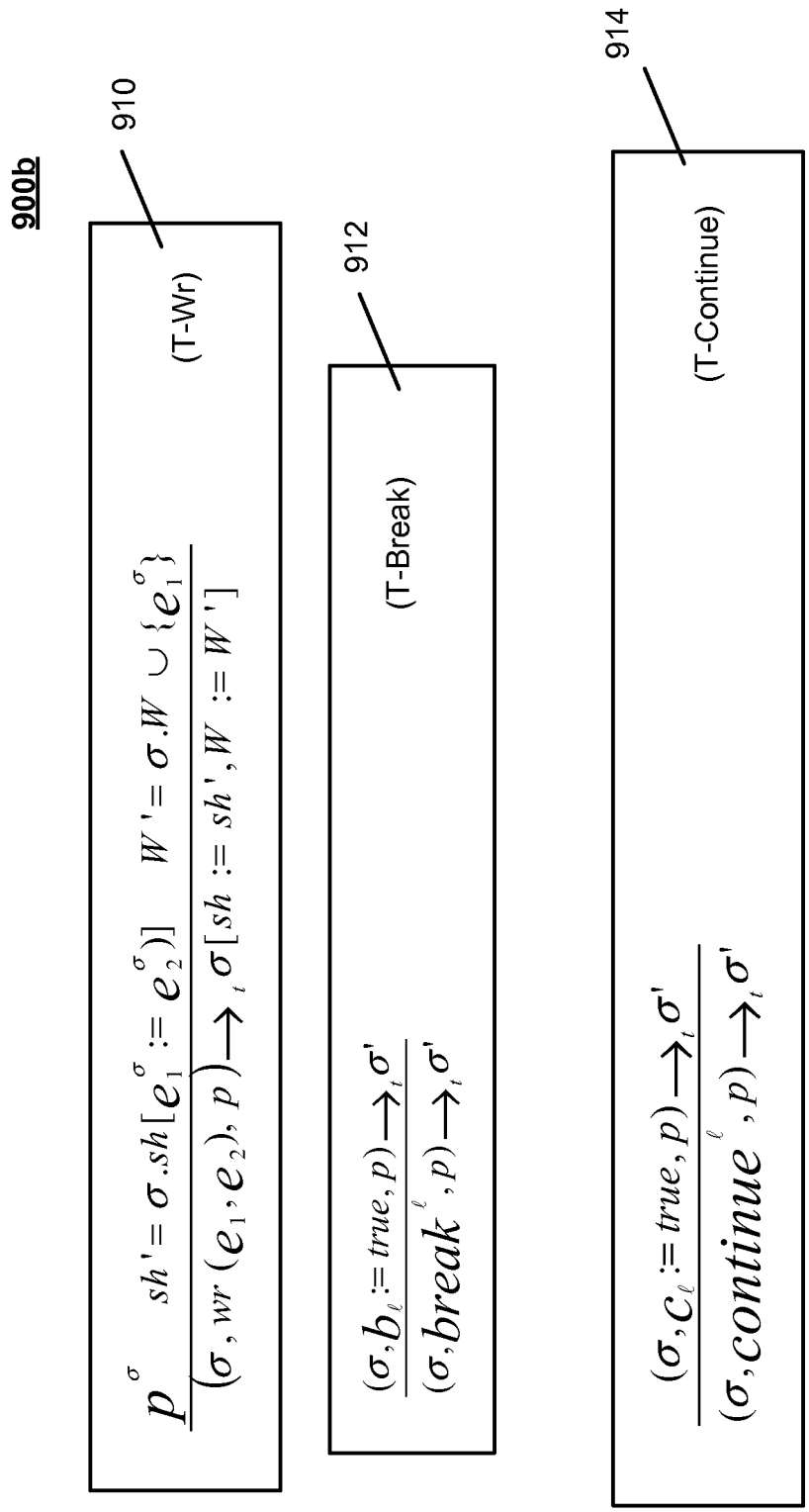

As shown in FIG. 9b, an example rule T-WR 910 is analogous to T-RD 908, with writes instead of reads as in T-RD 908.

An example rule T-BREAK 912 provides that an enabled thread may execute break$^l$ by setting a local variable $b_l$ to true.

As discussed further below, $\neg b_l$ is a conjunct appearing in the predicate guarding execution of a loop with label l so by setting $b_l$ to true, the thread becomes disabled for the remainder of this loop. As shown in an example rule T-CONTINUE 914, a continue$^l$ instruction may be handled similarly, setting $c_l$ to true. Example rules T-BREAK 912 and T-CONTINUE 914 interact with the rules G-DONE and G-ITER for while loops discussed further below.

Figure 10A:
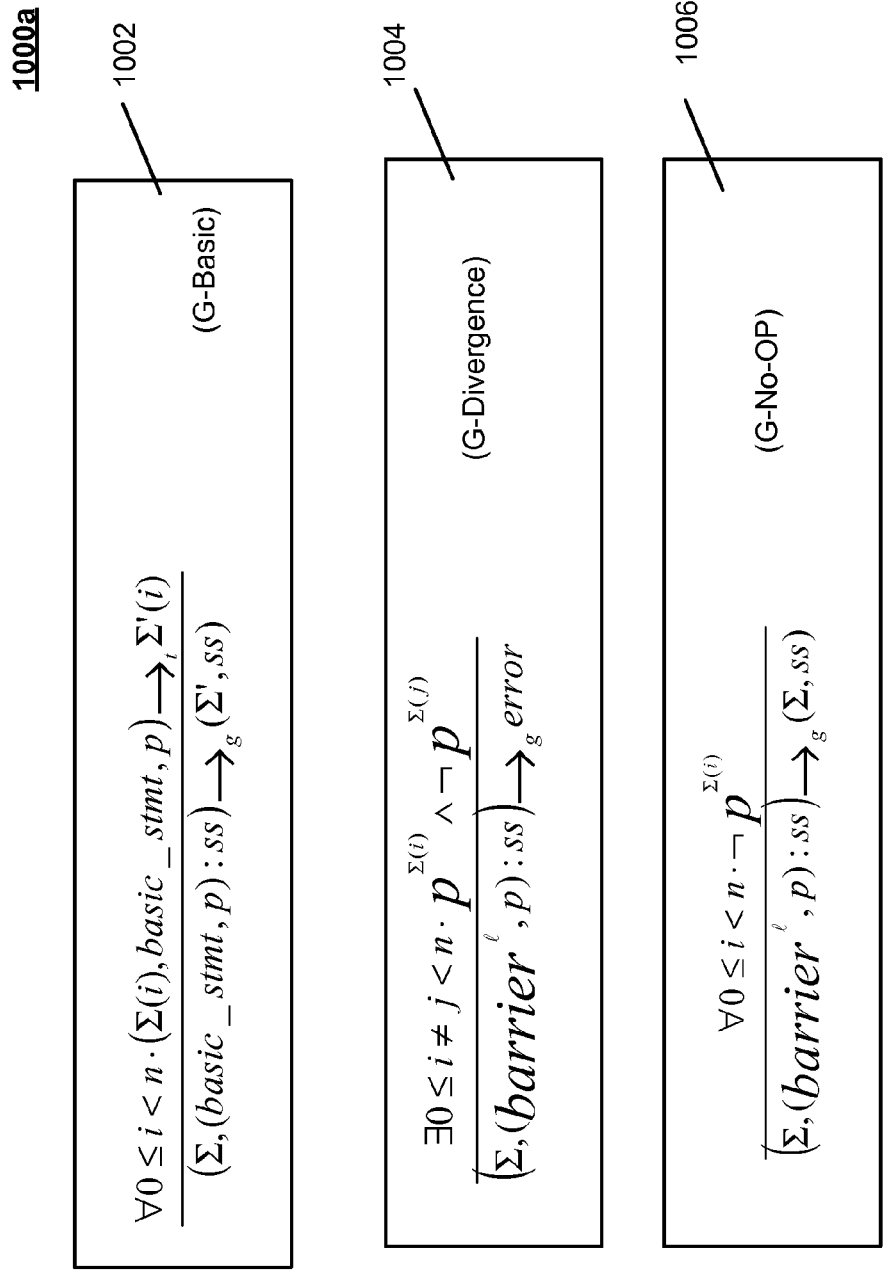
FIG. 10 depicts a set of example rules for lock-step execution of a group of threads, in accordance with example embodiments.

FIG. 10 depicts a set of example rules for lock-step execution of a group of threads. FIG. 10 defines an example binary relation $\rightarrow_g \subseteq$ GroupStates×(GroupStates∪{error}), where error is a designated error state. This relation describes the evolution of a group as it executes a sequence of predicated statements. As shown in FIG. 10*a*, an example rule G-BASIC 1002 provides that collective execution of a predicated basic statement is achieved by every thread executing the statement, and the order in which they do so is irrelevant.

If the group is due to execute a barrier statement under predicate p but not all threads agree on the truth of p, the error state is reached, as depicted by example rule G-DIVERGENCE 1004, which is in accordance with barrier divergence as discussed above. An example rule G-NO-OP 1006 provides that execution of barrier when all threads are disabled has no effect.

As shown in FIG. 10*b*, intra-group races may be detected via an example rule G-RACE 1008. The rule G-RACE 1008 indicates that if a group is due to execute a barrier statement and all threads are enabled, then when the read and write sets computed by each thread are compared, distinct threads i and j may not be determined such that the write set for thread i intersects with either the read or write set for thread j. If this scenario occurs, an error state is reached. An example predicate races(Σ) may be depicted herein as follows:

races(Σ)=∃0≤i≠j<n.(Σ(i).R∪Σ(I).W) ∩Σ(j). W≠∅

An example rule G-SYNC 1010 may provide an effect of a barrier synchronization in the absence of data races. A new thread state Σ'(i) is constructed for each thread i, with the same local component/as before the barrier. The barrier may enforce a consistent view of shared memory across the group by setting the shared shadow memories sh identically in each Σ'(i), which is achieved via a function merge. If thread i has recorded a write to shared memory location z, i.e., z∈Σ(i).W, then merge(Σ) maps z to the value at address z in thread i's shadow memory, i.e. to Σ(i).sh(z). More formally, merge(Σ) is a map satisfying:

$$\frac{z \in \Sigma(i).W \quad 0 \leq i < n}{\text{merge}(\Sigma)(z) = \Sigma(i).sh(z)}$$

$$\frac{\forall\, 0 \leq i < n \cdot z \notin \Sigma(i).W}{\text{merge}(\Sigma)(z) = \Sigma(0).sh(z)}$$

As races(Σ) is false (e.g., a premise of the rule G-SYNC 1010), merge(Σ) is distinct. Finally, the read and write sets of all threads are cleared.

The remaining rules in FIG. 10 describe predicated execution for compound statements. An example rule G-SEQ 1012 may provide sequencing.

Figure 10C:
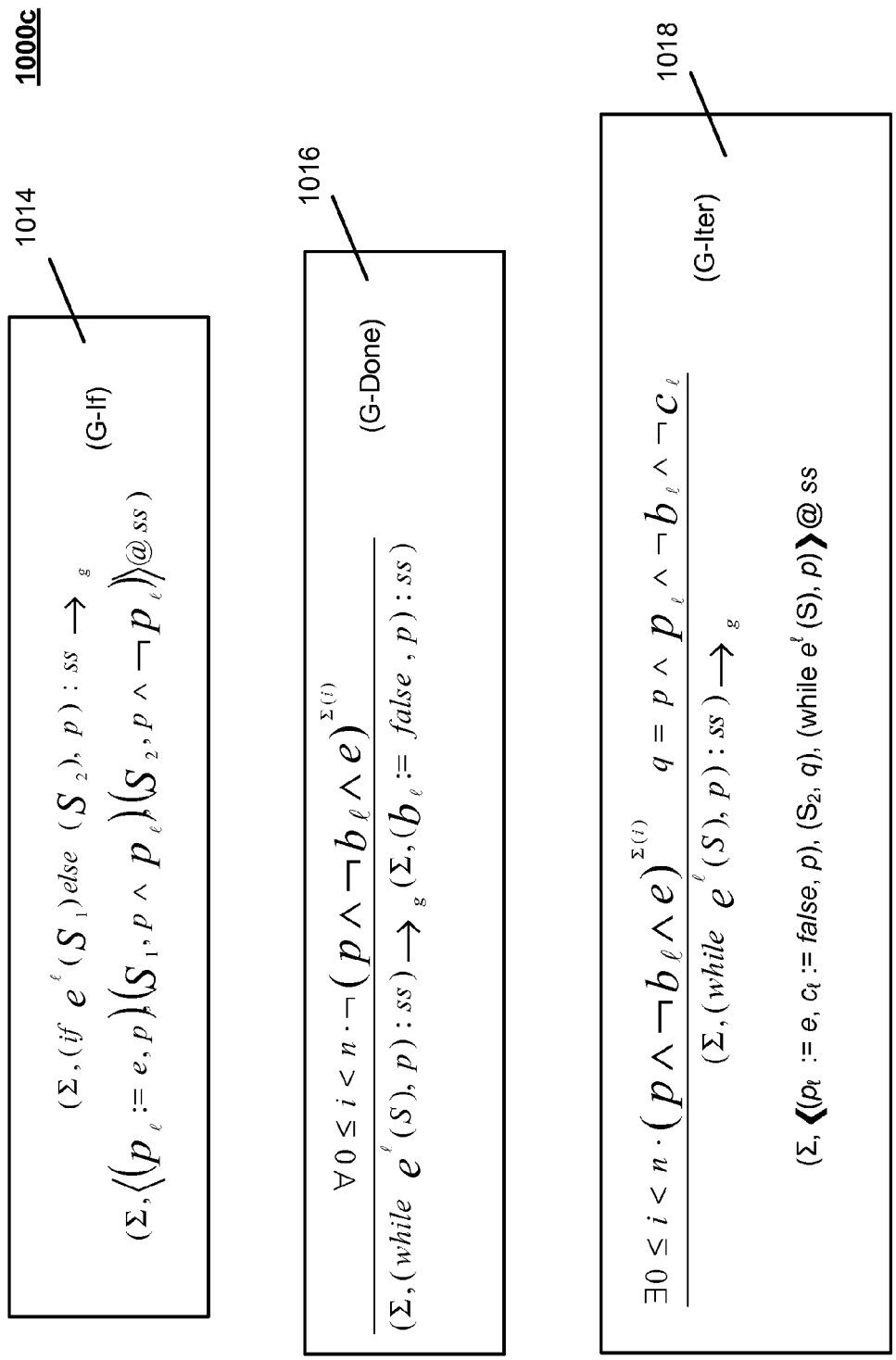

As shown in FIG. 10*c*, an example rule G-IF 1014 may provide decomposition of a conditional statement with label ℓ into a sequence of predicated statements. For example, the conditional's guard is evaluated into local variable $p_l$, the then branch $S_1$ is executed by all threads under predicate p∧$p_l$ (where p is the predicate of execution already in place on entry to the conditional), and the else branch $S_2$, is executed by all threads under predicate p∧¬$p_l$.

As shown in an example rule G-DONE 1016, for modeling predicated execution of a while loop with label ℓ, local variables $b_l$ and $c_l$ discussed with regard to break and continue above, may be used. Variable $b_l$ is true if a thread has broken out of the loop by executing break, while $c_l$ is true if a thread has executed continue during the current loop iteration. As defined by a valid initial state above, at the start of kernel execution, $b_l$ is set to false for all threads, and on exiting a loop, $b_l$ is reset to false. As a result, $b_l$ is false when execution of the loop commences. All threads continuously execute the loop body until, for every thread, either the thread has executed break, or the loop condition no longer holds for the thread.

An example rule G-ITER 1018 fires if all of p (the predicate of execution on entry to the loop), ¬$b_l$ (the thread has not yet broken the loop) and e (the loop condition) hold for some thread. In this case, for all enabled threads, the loop condition is computed into local variable $p_l$ and $c_l$ is set to false to indicate that the thread has not executed continue during this loop iteration. The loop body S is then executed under the predicate p∧$p_l$∧¬$b_l$∧¬$c_l$. Thus, threads that were enabled on entry to the loop (p holds), for whom the loop condition holds ($p_l$ holds), who have not broken the loop (¬$b_l$ holds), and who have not executed continue this loop iteration (¬$c_l$ holds), are enabled. After the loop body, the while construct is considered again.

Based on the SDV semantics discussed above, it may be verified that data parallel program instructions are race-free and divergence-free. More particularly as discusses below, it may be verified that a kernel is race-free and divergence-free. For example, a tool, referred to herein as GPUVerify, may be implemented on top of an example verification system. For example, a BOOGIE verification system is discussed in M. Barnett, et al., "Boogie: A modular reusable verifier for object-oriented programs," *In FMCO* 2005, *LNCS* vol. 4111, pp. 364-387 (2005). BOOGIE may obtain a program annotated with loop invariants and procedure contracts, and decomposes verification into a set of formulas. The formulas may then be checked automatically by a theorem prover. For example, a Z3 theorem prover is discussed in L. M. de Moura et al., "Z3: An efficient SMT solver," in *TACAS, LNCS* vol. 4963, pp. 337-340 (2008). A problem of automatically inferring invariants and procedure contracts is discussed further below.

GPUVerify obtains a GPU kernel, written in the BOOGIE input language, and attempts to either verify the kernel by finding inductive invariants, or falsify the kernel via bounded model checking For example, a bounded model checking technique is discussed in A. Biere, et al., "Bounded model checking," *Advances in Computers*, vol. 58, pp. 118-149 (2003).

For direct verification of kernel source code, a user may construct a front-end translating kernels written in CUDA, OpenCL or C++AMP to BOOGIE. Alternatively, kernels may be manually translated into BOOGIE.

Example verification techniques based on GPUVerify are discussed below using a worked example. A C-like syntax is used below for readability, rather than the BOOGIE input language. As discussed above, the discussion below does not distinguish between shared and global arrays, non-local state may be referred to as shared.

FIG. 11 depicts an example kernel 1000. As shown in FIG. 11, the kernel 1000 may be adapted from an application that determines the transitive closure of a graph using Warshall's algorithm. The example kernel 1100 is provided for a single, 2-dimensional group of SZxSZ threads. A thread's local id is two-dimensional, with x and y components lidX and lidY, respectively. The kernel 1100 declares a two-dimensional shared array 1102 of booleans, gr, representing the adjacency matrix of a graph. A while statement 1104 includes a first conditional statement 1106 and a second conditional statement 1106. A basic statement 1110 sets an array 1102 element to true (which involves a write access to shared memory). A barrier statement 1112 is located in the loop of the while statement 1104 before an increment statement 1114 of the loop variable k.

According to example embodiments herein, a kernel may first be instrumented with calls to procedures that will log accesses to shared arrays. FIG. 12 depicts an example instrumented kernel 1200, which is a result of the example kernel 1100 of FIG. 11 after access logging instrumentation, in accordance with example embodiments. According to example embodiments herein, a kernel may first be instrumented with calls to procedures 1202, 1204 that will log accesses to shared arrays. For example, the condition gr [lidY] [k] && gr [k] [lidX] (included in the conditional statement 1108) involves two read accesses to array 1102 gr, thus is pre-pended by two calls 1206, 1208 to LOG RD_gr. The condition !gr [lidY] [lidX] (included in the conditional statement 1106) involves a read access to array 1102 gr, thus is pre-pended by a call 1210 to LOG_RD_gr. The basic statement 1110 involves a write access to array 1102 gr, thus is pre-pended by a call 1212 to LOG_WR_gr.

After access logging, the kernel may be translated into a form which models the predicated execution of multiple threads in a group. Experimental results indicated that direct encoding, modeling lock-step execution of all threads in a group involved undesirable use of quantifiers, for example, for implementing the G-SYNC 1010 rule of FIG. 10b and associated merge function, resulting in BOOGIE programs outside the decidable theory supported by the Z3 theorem prover.

As discussed further herein, both the properties of race-freedom and divergence-freedom may be stated pairwise. For example, a race occurs when accesses by two threads conflict, and divergence occurs when a barrier is executed in a state where one thread is enabled and another disabled. Based on this observation, a kernel may be transformed into a form wherein the predicated execution of only two threads is modeled. If a kernel can be proved race-free and divergence-free for a pair of distinct but otherwise arbitrary threads, it is possible to conclude correctness of the kernel. Because a two-threaded predicated program with lock-step execution may be considered a sequential program including parallel assignments to pairs of variables, reasoning about GPU kernels at this level may avoid the problem of analyzing interleavings of concurrent threads, allowing users to leverage techniques for modular reasoning associated with sequential programs.

According to example embodiments herein, the example rule G-SYNC 1010 of FIG. 10b may be approximated, abstracting the effect on the shared state of threads that are not modeled. One skilled in the art of data processing will understand that this can be achieved in many ways, without departing from the spirit of the discussion herein. Example strategies may include (1) full abstraction, wherein the shared state is completely removed, as reads are replaced with non-deterministic assignments; and (2) equality abstraction, as both threads manipulate a shadow copy of the shared state. At a barrier, the shadow copies are set to be arbitrary, but equal. Thus, on leaving the barrier, the threads have a consistent view of shared memory.

Experimental results have indicated that, for several example kernels, race-freedom may hinge on threads agreeing on the value of various shared locations. In these cases, full abstraction is too strong for successful verification. However, in such cases, it does not matter what specific value is stored in shared memory, only that all threads view the same value. The equality abstraction suffices for such cases.

FIG. 13 depicts an example kernel 1300 resulting from transforming the access-instrumented kernel 1200 of FIG. 12 into a form wherein the predicated execution of a pair of arbitrary, distinct threads is modeled, using the equality abstraction, in accordance with example embodiments. The transformation using full abstraction may be substantially identical, except that arrays gr1 and gr2 are eliminated, and reads from these arrays are made nondeterministic.

As shown in FIG. 13, the id of the first thread is represented by the pair lidX1, lidY1, and the id of the second thread is represented by the pair lidX2, lidY2. An assume statement 1302 indicates that at least one of lidX and lidY will differ between the threads (FIG. 12 omits an additional precondition ensuring that the id components lie in the range [0..sz]).

Local variable k is duplicated, and the assignment k=0 replaced with a parallel assignment 1304, setting k1 and k2 to zero. The kernel declares (1306) boolean variables LC, P and Q (duplicated for each thread), which may be used to model predicated execution of the while loop 1104 (via LC) and the outer and inner conditionals 1106, 1108 (via P and Q respectively). As discussed above, under predicated execution a while loop will continue to execute while there exists a thread for which the condition holds. In the presence of just two threads, existential quantification may be implemented as disjunction, providing a loop condition LC1||LC2 for the while statement 1104.

As shown in FIG. 13, parameters to the LOG_RD_gr and LOG_WR_gr procedures 1202, 1204 are duplicated, with a parameter being passed for each thread. In addition, a predicate parameter, en, is passed for each thread, recording whether the thread is enabled during the call. If LOG_RD_gr 1202 is called with false as its en1 parameter, the first thread is not enabled, and thus a read may not be logged for this thread. Similarly, BARRIER 1112 is provided with a pair of predicate parameters, en1 and en2.

According to example embodiments herein, during the transformation to two-threaded form, the parameter list of each user-defined procedure is duplicated, and (as with the LOG and BARRIER procedures) enabled predicates are added for each thread. The procedure body is then translated to two-threaded, predicated form, with each statement guarded by the enabled predicate parameters. Correspondingly, actual parameters are duplicated at call sites, and the current predicates of execution passed as enabled parameters.

Under the two-thread encoding, inserting a check for barrier divergence is simple, as the BARRIER 1112 procedure simply asserts that its arguments en1 and en2 are equal. This two-threaded version of the example rule G-DIVERGENCE 1004 of FIG. 10a matches the essence of barrier divergence discussed above. A user may wish to only check divergence-freedom for a kernel, if verifying race-freedom proves difficult. Such checking may be sound under full abstraction, where every read from the shared state returns an arbitrary value. A kernel that can be shown divergence-free under this assumption may be divergence-free under any schedule of shared state modifications. If a user proves divergence-freedom for a kernel under the equality abstraction, a weaker property than divergence-freedom may be concluded, as barrier divergence may not occur unless a data race has occurred.

The LOG_RD and LOG_WR procedures 1202, 1204 may manipulate a read and write set for each thread, for each of the kernel's shared arrays. According to the semantics example rule G-RACE 1008 of FIG. 10b, race checking may involve asserting inside BARRIER 1112 for each array A that the read and write sets for A do not conflict between threads. Alternatively, race-freedom may be immediately asserted whenever an access is logged. According to an example embodiment, GPUVerify employs this eager method, which may provide faster analysis, according to experimental results.

Read and write sets for an array may be directly modeled in BOOGIE as characteristic functions. Checking for races may then involve placing quantified assertions in the LOG_RD and LOG_WR procedures 1202, 1204. At a barrier, read and write sets may be cleared by havocking their contents, then assuming emptiness via a quantified assumption. This example approach may be referred to herein as the "set encoding."

According to example embodiments herein, an alternative technique, referred to herein as "element encoding," avoids quantified assertions and assumptions. With element encoding, each shared array A with index type T is provided with the following variables for each of the two threads under consideration: WR_exists_A: bool, WR_elem_A: T, RD_exists_A: bool, RD_elem_A: T.

Boolean WR_exists_Ai is set to true if and only if thread i's write set for A is non-empty. In this case, WR_elem_Ai represents one element of this write set, e.g., an index into A. The corresponding variables for read sets are similar.

Initially all read and write sets are empty, so WR/RD_exists_A are initialized to false for both threads. The LOG_WR_A procedure then proceeds in accordance with: for each thread i, if i is enabled on entry to the procedure (e.g., predicate parameter eni is true), then the thread nondeterministically chooses to do nothing, or to set WR_exists_Ai to true and WR_elem_Ai to the index being logged. Procedure LOG_RD_A operates similarly. This example technique provides that if WR_exists_Ai holds, WR_elem_Ai is the index of an arbitrary write to A performed by thread i. Checking absence of write-write races can then be achieved by placing the following quantifies-free assertion in the LOG_WR_A procedure:

assert(!(WR_exists_A1 ∧ WR_exists_A2
∧ WR_elem_A1==WR_elem_A2)).

Procedure LOG_WR_A proceeds analogously, and a similar assertion may be used to check read-write races.

As this encoding tracks an arbitrary element of each read and write set, if the sets can have a common, conflicting element this may be tracked by both threads along some execution trace, and the generated assertion may fail along this trace. If a user can prove for every array that the associated assertions will not fail, the user may conclude that the kernel is race-free. At a barrier, read and write sets may be cleared by setting the WR/RD_exists booleans to false.

According to example embodiments herein, the element encoding removes reasoning about sets using quantifiers. Experimental results have indicated that the element encoding may outperform the set encoding, that cases may exist wherein verification may succeed only with the element encoding, due to challenges posed by quantifiers when the set encoding is used.

To detect read-write races, log read sets may be logged for one of the two threads under consideration. For example, as the threads are arbitrary, a proof of a two-threaded program may hold for any concrete thread assignment, thus implicitly read-write races may be checked in both directions for all pairs of threads. This type of symmetry breaking may result in fewer instrumentation variables and a reduced number of assertions, which may provide more rapid verification.

In accordance with example embodiments herein, GPU-Verify may provide a BOOGIE program similar to the transformed kernel of FIG. 13, together with implementations of BARRIER and all LOG_RD/WR procedures according to race checking encoding used. While data races or barrier divergence in the resulting program may be identified by performing bounded model checking (e.g., considering all execution traces up to some user-specified depth), verifying freedom from races and divergence may involve finding inductive invariants for loops, and pre- and post-conditions for procedures, which may be referred to collectively as invariants.

For example, an example HOUDINI technique, as discussed in C. Flanagan et al., "Houdini, an annotation assistant for ESC/Java," *In Proceedings of the International Symposium of Formal Methods Europe on Formal Methods for Increasing Software* (FME '01), 2001, pp. 500-517, may be used as a basis for inferring invariants. HOUDINI is an example technique for determining a largest set of inductive invariants from a user-supplied pool of candidate invariants. HOUDINI may be implemented as a fixpoint procedure. For example, starting with a set of invariants, it attempts to prove that the current candidate set is inductive. The invariants that cannot be proved are dropped from the candidate set and the procedure is repeated until a fixpoint is reached.

Through manual deduction of invariants for a selection of kernels, candidate invariants for divergence-freedom and for race-freedom that can be automatically generated by GPU-Verify may be identified.

In accordance with example embodiments herein, with regard to the candidate invariants for divergence-freedom, for each local variable (including predicates introduced during kernel transformation), a candidate invariant asserting equality may be added on the variable between threads. For the kernel 1300 of FIG. 13, candidates may be generated as:

k1==k2, LC1==LC2, P1==P2, Q1==Q2.

In this example, k1==k2 && LC1==LC2 is an inductive invariant for the while loop 1104 strong enough to prove divergence-freedom.

In accordance with example embodiments herein, with regard to the candidate invariants for race-freedom, for every shared array, four candidates may be generated, asserting that the associated read and write sets are empty for both threads under consideration. The BARRIER procedure clears read and write sets, and thus these sets belong to the "modifies" set for any loop that includes a barrier. For example, without a loop invariant, BOOGIE may assume that these sets are arbitrary when reasoning about program fragments following such a loop. For example, the empty candidates may allow race-freedom to be established in a scenario wherein a loop does not involve accesses to some arrays.

For example, if a thread accesses a shared array using only its thread id as an index, the two threads may never race on the array. As an example result, four further candidates may be generated for each array, asserting that the associated read and write sets for each thread include at most the thread's id.

In accordance with experimental results, the above candidates may allow fully automatic proofs of divergence-freedom for many kernels, as well as fully automatic proofs of race-freedom for many kernels.

In accordance with example embodiments herein, other potential classes of candidates may also be useful for race-checking, for example, asserting that a variable is a power of two located in a given range, and asserting that the read and write sets for a thread with id lid include only indices x such that x mod SZ=lid, wherein SZ is the size of the thread group. The first class may appear in kernels that perform reduction operations. The second class may appear when a thread group accesses an array in steps of size SZ, with each thread accessing data via an offset of the form c×SZ+lid.

In accordance with example embodiments herein, a user may provide a file of additional candidate invariants to GPU-Verify, for example, for use by HOUDINI. For example, HOUDINI may determine placement of these candidates, as well as determining combinations.

In experimental evaluations, an example version of GPU-Verify has been implemented using a set of 22 GPU kernels, with five kernels provided with a CUDA distribution, and 17 kernels distributed as part of C++AMP. The size ranged from 41 to 161 lines, spread over 1-3 procedures. This may be representative of a size of GPU kernels. However, kernels having more than 1000 lines may also be analyzed using example techniques discussed herein. Experiments may be performed, for example, on a PC with a 3.4 GHz INTEL CORE i7-2600 CPU, 8 GB RAM running WINDOWS 7 (64-bit), with BOOGIE v2.2 and Z3 v3.2. One skilled in the art of data processing will understand that many other configurations may also be used for implementation of the example techniques discussed herein.

The results showed that the example version of GPUVerify facilitates acceptable verification.

Example embodiments discussed herein may provide an operational semantics for GPU kernels. Example techniques discussed herein may provide formal verification of race-freedom and divergence-freedom.

One skilled in the art of data processing will understand that there are many ways of verifying data parallel program instructions, without departing from the spirit of the discussion herein.

Customer privacy and confidentiality have been ongoing considerations in data processing environments for many years. Thus, example techniques for static verification of data parallel program instructions may use user input and/or data provided by users who have provided permission via one or more subscription agreements (e.g., "Terms of Service" (TOS) agreements) with associated applications or services associated with static verification of data parallel program instructions. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
at least one hardware device processor;
a symbolic encoding component that obtains a symbolic encoding of predicated execution for static verification, by obtaining a translated program that includes a plurality of data parallel program instructions, the translated program translated to a form modeling the predicated execution of two arbitrary and distinct threads and instrumented with calls to executable procedures configured to log accesses to shared memory locations by logging an indicator of a location that is accessed, and which of the two threads is responsible for the logged accesses, and a current enablement status for each of the two threads at a time of the logged accesses; and
a static verification component that obtains, via the at least one device processor, a result of static verification of one or more attributes associated with the plurality of data parallel program instructions, based on the symbolic encoding, and on results of one or more assertions of a barrier procedure that a pair of predicate values indicate a same state of enablement for the threads using boolean operations, to indicate whether the threads are both enabled at a time of the one or more assertion the barrier procedure, on results of one or more of the logged accesses.

2. The system of claim 1, wherein:
the static verification component includes a race freedom component that obtains a result of static verification of race freedom associated with the plurality of data parallel program instructions, based on the symbolic encoding.

3. The system of claim 1, wherein:
the static verification component includes a divergence freedom component that obtains a result of static verification of divergence freedom associated with the plurality of data parallel program instructions, based on the symbolic encoding.

4. The system of claim 1, wherein:
the static verification component obtains, via the device processor, the result of static verification based on a compile time verification of the one or more attributes associated with the plurality of data parallel program instructions, based on the symbolic encoding of the plurality of data parallel program instructions that include Graphics Processing Unit (GPU) kernel program instructions.

5. The system of claim 1, wherein:
the static verification component obtains the result of static verification of the one or more attributes associated with the plurality of data parallel program instructions, based on the symbolic encoding, based on one or more of set encoding or element encoding.

6. The system of claim 1, further comprising:
an access logging component that initiates logging operations for shared memory accesses, based on predicated execution operations of one or more threads between a first barrier and a second barrier, during the static verification.

7. The system of claim 2, wherein:
the race freedom component obtains the result of static verification of race freedom associated with the plurality of data parallel program instructions, based on the symbolic encoding of the plurality of data parallel program instructions that include Graphics Processing Unit (GPU) kernel program instructions.

8. The system of claim 2, wherein:
the race freedom component obtains the result of static verification of race freedom based on obtaining a result of static verification of intra-group data race freedom associated with a plurality of threads assigned to execute one or more Graphics Processing Unit (GPU) kernel program instructions.

9. The system of claim 3, wherein:
the divergence freedom component obtains the result of static verification of divergence freedom associated with the plurality of data parallel program instructions, based on the symbolic encoding of the plurality of data parallel program instructions that include Graphics Processing Unit (GPU) kernel program instructions.

10. The system of claim 3, wherein:
the divergence freedom component obtains the result of static verification of divergence freedom based on obtaining the result of static verification of barrier divergence freedom associated with a plurality of threads assigned to execute one or more Graphics Processing Unit (GPU) kernel program instructions.

11. A method comprising:
obtaining a symbolic encoding of predicated execution for static verification, by obtaining a translated program that includes one or more data parallel program instructions, the translated program translated to a form modeling the predicated execution of a plurality of threads and instrumented with calls to executable procedures configured to log accesses to shared memory locations by logging an indicator of a location that is accessed, and which of the thread is responsible for the logged accesses, and a current enablement status for each of the threads at a time of the logged accesses; and
obtaining, via a device processor, a result of static verification of divergence freedom associated with the one or more data parallel program instructions based on the symbolic encoding, the result of the static verification of divergence freedom based on an assertion of a barrier procedure that a pair of predicate values indicate a same state of enablement for a corresponding pair of arbitrary and distinct threads, the assertion using boolean operators to indicate whether the pair of arbitrary and distinct threads are both enabled at a time of the assertion of the barrier procedure.

12. The method of claim 11, further comprising:
obtaining, via the device processor, a result of static verification of race freedom associated with the one or more data parallel program instructions based on the symbolic encoding.

13. The method of claim 11, wherein:
obtaining the result of static verification of divergence freedom includes obtaining the result of static verification of barrier divergence freedom associated with a plurality of threads assigned to execute one or more Graphics Processing Unit (GPU) kernel program instructions.

14. The method of claim 11, wherein:
obtaining the result of static verification is based on one or more of set encoding or element encoding.

15. The method of claim 11, further comprising:
initiating logging operations for shared memory accesses, based on predicated execution operations of one or more threads between a first barrier and a second barrier, during the static verification.

16. A computer program product comprising a hardware computer-readable storage medium storing executable code that, when executed, causes at least one data processing apparatus to:
obtain a symbolic encoding of predicated execution for static verification, by obtaining a translated program that includes one or more data parallel program instructions, the translated program translated to a form modeling predicated execution of two arbitrary and distinct threads and instrumented with calls to executable procedures configured to log accesses to shared memory locations by logging an indicator of a location that is accessed, and which of the two threads is responsible for the logged accesses, and a current enablement status for each of the two threads at a time of the logged accesses; and
obtain a result of static verification of race freedom associated with the one or more data parallel program instructions based on the symbolic encoding, the result of the static verification of race freedom based on one or more assertions of a barrier procedure that a pair predicate values indicate a same state of enablement for the threads using boolean operation, to indicate whether the threads are both enabled at a time of the one or more assertion the barrier procedure and the logged accesses to the shared memory locations are not in conflict between the two threads.

17. The computer program product of claim 16, wherein the executable code, when executed, causes the at least one data processing apparatus to:
obtain a result of static verification of divergence freedom associated with the one or more data parallel program instructions based on the symbolic encoding.

18. The computer program product of claim 16, wherein:
obtaining the result of static verification of race freedom includes obtaining a result of static verification of intra-group data race freedom associated with a plurality of threads assigned to execute one or more Graphics Processing Unit (GPU) kernel program instructions.

19. The computer program product of claim 16, wherein:
obtaining the result of static verification is based on one or more of set encoding or element encoding.

20. The computer program product of claim 16, wherein the executable code, when executed, causes the at least one data processing apparatus to:
initiate logging operations for shared memory accesses, based on predicated execution operations of one or more threads between a first barrier and a second barrier, during the static verification.

* * * * *